United States Patent
Takesue

(10) Patent No.: US 12,192,433 B2
(45) Date of Patent: Jan. 7, 2025

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Naoya Takesue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/524,912

(22) Filed: Nov. 30, 2023

(65) Prior Publication Data
US 2024/0195931 A1    Jun. 13, 2024

(30) Foreign Application Priority Data
Dec. 12, 2022 (JP) .................. 2022-198092

(51) Int. Cl.
*H04N 1/60* (2006.01)
(52) U.S. Cl.
CPC ......... *H04N 1/6033* (2013.01); *H04N 1/6008* (2013.01)
(58) Field of Classification Search
CPC .................... H04N 1/6033; H04N 1/6008
See application file for complete search history.

(56) References Cited

U.S. PATENT DOCUMENTS

| | | | | |
|---|---|---|---|---|
| 6,671,421 B1* | 12/2003 | Ogata | ............ | H04N 1/00045 |
| | | | | 382/284 |
| 2013/0271779 A1* | 10/2013 | Suzuki | ............ | H04N 1/6058 |
| | | | | 358/1.9 |
| 2019/0089868 A1* | 3/2019 | Nakahara | ............ | H04N 1/6033 |
| 2019/0124231 A1 | 4/2019 | Takesue et al. | ......... | H04N 1/54 |
| 2019/0387131 A1 | 12/2019 | Komatsu et al. | ..... | H04N 1/6044 |
| 2023/0055221 A1 | 2/2023 | Takesue | .................. | G06T 7/90 |
| 2023/0082464 A1 | 3/2023 | Kikuta et al. | ......... | G06K 15/02 |

FOREIGN PATENT DOCUMENTS

| | | |
|---|---|---|
| JP | 2014-168933 | 9/2014 |
| JP | 2019-220828 | 12/2019 |

OTHER PUBLICATIONS

U.S. Appl. No. 18/472,905, filed Sep. 22, 2023.

* cited by examiner

*Primary Examiner* — Akwasi M Sarpong
*Assistant Examiner* — Michael L Burleson
(74) *Attorney, Agent, or Firm* — Venable LLP

(57) ABSTRACT

Based on scanned data obtained by a scan unit reading a first chart printed and output by a printing unit and colorimetric data obtained by a colorimetry unit measuring the first chart, correction information for correcting a sensed value of the scan unit is generated. The first chart includes a patch extending in a main scanning direction substantially perpendicular to a sheet conveyance direction and having a uniform density, and a position adjustment pattern formed outside the patch for identifying a position in the main scanning direction on the patch. A first generation unit generates the correction information by causing a pixel position of an end portion of the patch in the scanned data and a colorimetry position of an end portion of the patch in the colorimetric data to correspond to each other and determining a corrected value of the sensed value at a specific pixel position.

17 Claims, 20 Drawing Sheets

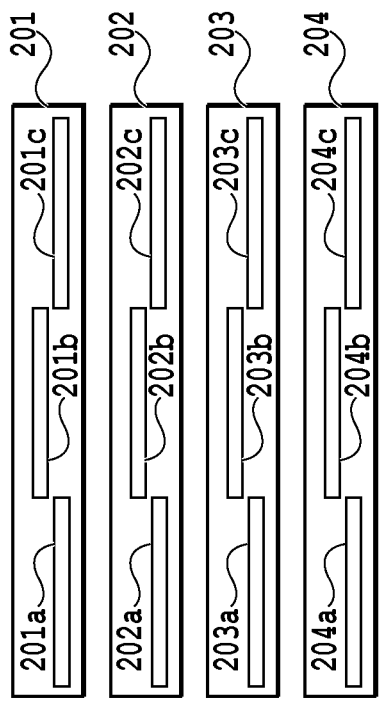
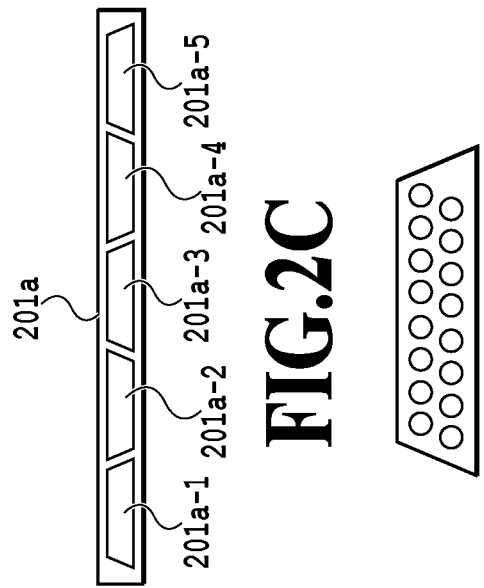
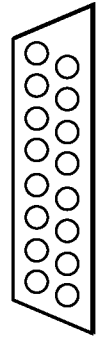
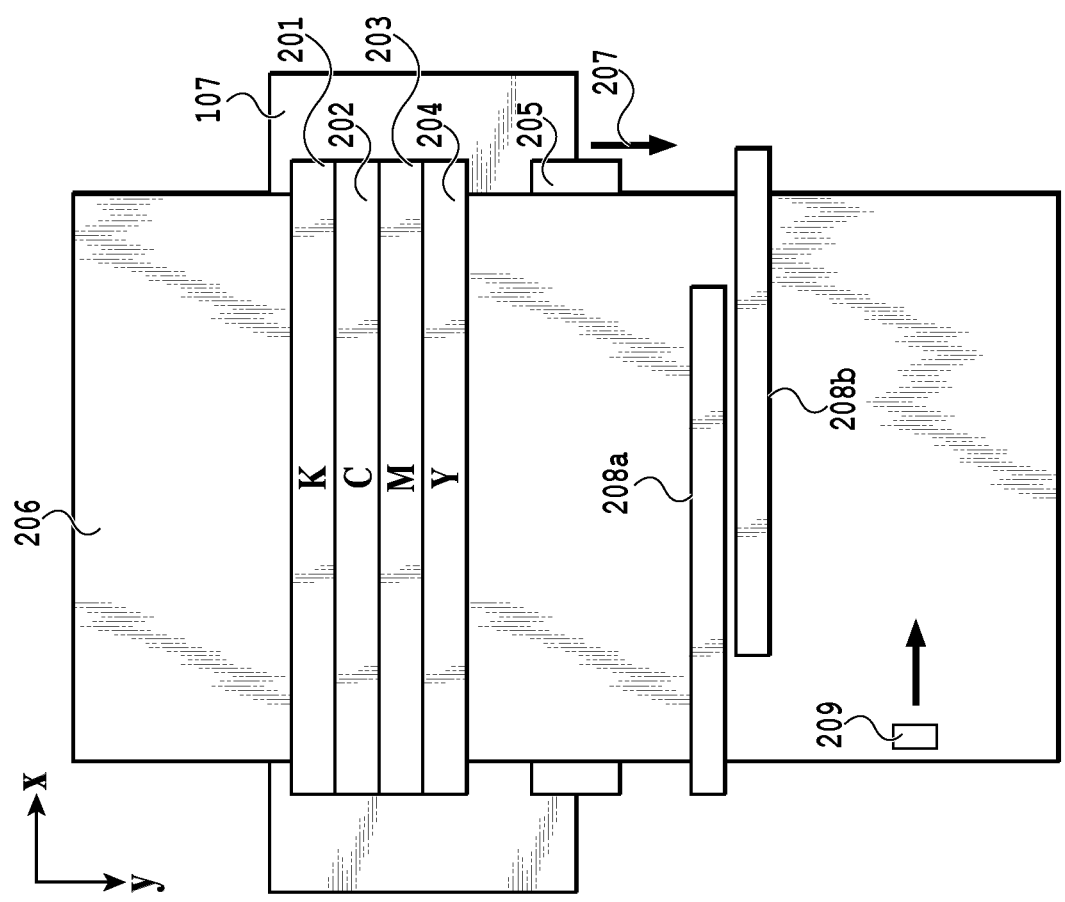
FIG.2B
FIG.2C
FIG.2D
FIG.2A

| Input color signal value | Print head 201 (K) | | | Print head 202 (C) | | | Print head 203 (M) | | | Print head 204 (Y) | | |
|---|---|---|---|---|---|---|---|---|---|---|---|---|
| | 201a | 201b | 201c | 202a | 202b | 202c | 203a | 203b | 203c | 204a | 204b | 204c |
| 0 | 0 | 0 | 0 | 0 | 0 | 0 | 0 | 0 | 0 | 0 | 0 | 0 |
| 16 | 14 | 16 | 20 | 15 | 16 | 12 | 10 | 16 | 13 | 22 | 16 | 15 |
| 32 | 28 | 32 | 39 | 31 | 32 | 25 | 20 | 32 | 26 | 46 | 32 | 30 |
| ... | ... | ... | ... | ... | ... | ... | ... | ... | ... | ... | ... | ... |
| 240 | 221 | 240 | 255 | 238 | 240 | 185 | 148 | 240 | 197 | 255 | 240 | 232 |
| 255 | 236 | 255 | 255 | 250 | 255 | 202 | 159 | 255 | 211 | 255 | 255 | 252 |

FIG.4

| Sensed value | Pixel position [x] | | | | | | |
|---|---|---|---|---|---|---|---|
| | 0 | 100 | 200 | 300 | 400 | ... | 3500 |
| 0 | 0 | 0 | 0 | 0 | 0 | ... | 0 |
| 16 | 29 | 25 | 24 | 24 | 23 | ... | 15 |
| 32 | 40 | 39 | 37 | 36 | 36 | ... | 33 |
| ... | ... | ... | ... | ... | ... | ... | ... |
| 240 | 240 | 239 | 239 | 239 | 238 | ... | 238 |
| 255 | 255 | 255 | 255 | 255 | 255 | ... | 255 |

FIG.5

|  | | Pattern formation nozzle number | | | |
|---|---|---|---|---|---|
|  | | 000 | 016 | 032 | ... |
| x position | 810a | 712 | 720 | 729 | ... |
|  | 810b | 713 | 721 | 729 | ... |
|  | ⋮ | ⋮ | ⋮ | ⋮ | ⋮ |
|  | 810f | 716 | 724 | 728 | ... |
|  | ⋮ | ⋮ | ⋮ | ⋮ | ⋮ |
|  | 810j | 714 | 721 | 730 | ... |

FIG.9

IMAGE FORMING APPARATUS, CONTROL METHOD OF IMAGE FORMING APPARATUS, AND STORAGE MEDIUM

BACKGROUND

Field

The present disclosure relates to a color adjustment technique of a printer.

Description of the Related Art

As an image forming apparatus for forming an arbitrary image on a paper surface, an ink jet (IJ) printer is used widely, which forms an image by ejecting ink droplets from a plurality of nozzles. It is difficult to completely prevent the ink landing position and ejection amount from deviating from the target position and ejection amount in all the nozzles arranged side by side in the print head and there is a case where belt-shaped or streak-shaped density unevenness (banding) appears on a printed material.

Consequently, color adjustment (called "head shading correction") to correct printing-target image data is performed in accordance with the printing characteristics of each nozzle (or each module), such as the shift of the ink ejection amount and the landing position, so that the density unevenness does not occur. In the head shading correction, the printing characteristics of the print head are obtained by scanning a test chart, but in a case where there are variations of the sensor reading characteristics, the variations of the sensor reading characteristics are taken in as the printing characteristics. In this case, on the contrary, the head shading correction causes the density unevenness to occur. Consequently, prior to the scan of a test chart, calibration of illumination and sensors is performed generally with reference to a white reflection standard provided internally or externally. However, resulting from the angle dependence of the sensors and illumination, the sheet surface characteristics and the like, particularly in a case where the intensity and the spectral characteristics of gray, chromatic color or the like are different from those of the white reflection standard, there is a possibility that the variations of the sensor reading characteristics persist. In this regard, Japanese Patent Laid-Open No. 2019-220828 has described a technique to suppress density unevenness resulting from the sensor reading characteristics by correcting the scanned data of a plurality of patch images of a plurality of tones based on the colorimetric data of a uniform patch image of each color of CMYK. Further, Japanese Patent Laid-Open No. 2014-168933 has disclosed a technique to insert a mark into a patch, which is for causing the position on the colorimetric data for determining the colorimetry position on the colorimetric data and the position on the image data to correspond to each other.

As described above, in the head shading correction, a printed material is read for obtaining the printing characteristics. At this time, as the reading resolution, it is frequent to use the resolution double, the same as, or half the printing resolution of the image forming apparatus. On the other hand, in a case where colorimetry is performed for a printed material by a colorimeter, it is difficult to perform colorimetry with substantially the same resolution as the printing resolution, and generally, it is only possible to obtain a colorimetric value with the resolution one tenth to one hundredth of the printing resolution. Further, in a case where colorimetry is performed manually, it is difficult to accurately control the colorimetry position. As a result of that, in correcting the sensor characteristics of the scanner device based on the colorimetric data, there is a case where correction is not sufficient because the correspondence between the colorimetric data and the scanned data is not performed successfully on the image. Further, it is common that the color space of colorimetric data and that of scanned data are different because of the difference in the obtaining device. As a result of that, there is a possibility that the correction accuracy decreases in a case where a high-frequency pattern exists on the test chart that is used in obtaining the sensor reading characteristics. That is, there is a case where inserting a mark (blank portion) for causing colorimetric data and scanned data to correspond to each other into a patch as in the method of Japanese Patent Laid-Open No. 2014-168933 described above leads to a reduction in the correction accuracy.

SUMMARY

The image forming apparatus according to the present disclosure includes: a printing unit configured to perform print processing while conveying a sheet based on image data; a first generation unit configured to generate correction information for correcting a sensed value (value obtained by sensor) of a scan unit based on scanned data obtained by the scan unit reading a first chart printed and output by the printing unit and colorimetric data obtained by a colorimetry unit measuring the first chart; a second generation unit configured to generate color adjustment information in accordance with characteristics of the printing unit by correcting the sensed value of the scan unit by using the correction information based on colorimetric data obtained by the colorimetry unit measuring a second chart printed and output by the printing unit; and an image processing unit configured to perform color adjustment processing for the image data by using the color adjustment information, and the first chart includes a patch extending in a main scanning direction substantially perpendicular to a sheet conveyance direction and having a uniform density, and a position adjustment pattern formed outside the patch for identifying a position in the main scanning direction on the patch and the first generation unit generates the correction information by causing a pixel position of an end portion of the patch in the scanned data and a colorimetry position of an end portion of the patch in the colorimetric data to correspond to each other and determining a corrected value of the sensed value at a specific pixel position.

Further features of the present disclosure will become apparent from the following description of exemplary embodiments with reference to the attached drawings.

BRIEF DESCRIPTION OF THE DRAWINGS

FIG. 2A is a diagram showing a configuration example of the periphery of a printing unit, FIG. 2B is an enlarged diagram of a print head, FIG. 2C is an enlarged diagram of a head module, and FIG. 2D is an enlarged diagram of a chip module;

FIG. 4 is a diagram showing one example of a color adjustment table;

FIG. 5 is a diagram showing one example of a scan correction table;

FIG. 9 is a diagram explaining position adjustment processing;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Hardware Configuration of Image Forming Apparatus>

Figure 1:
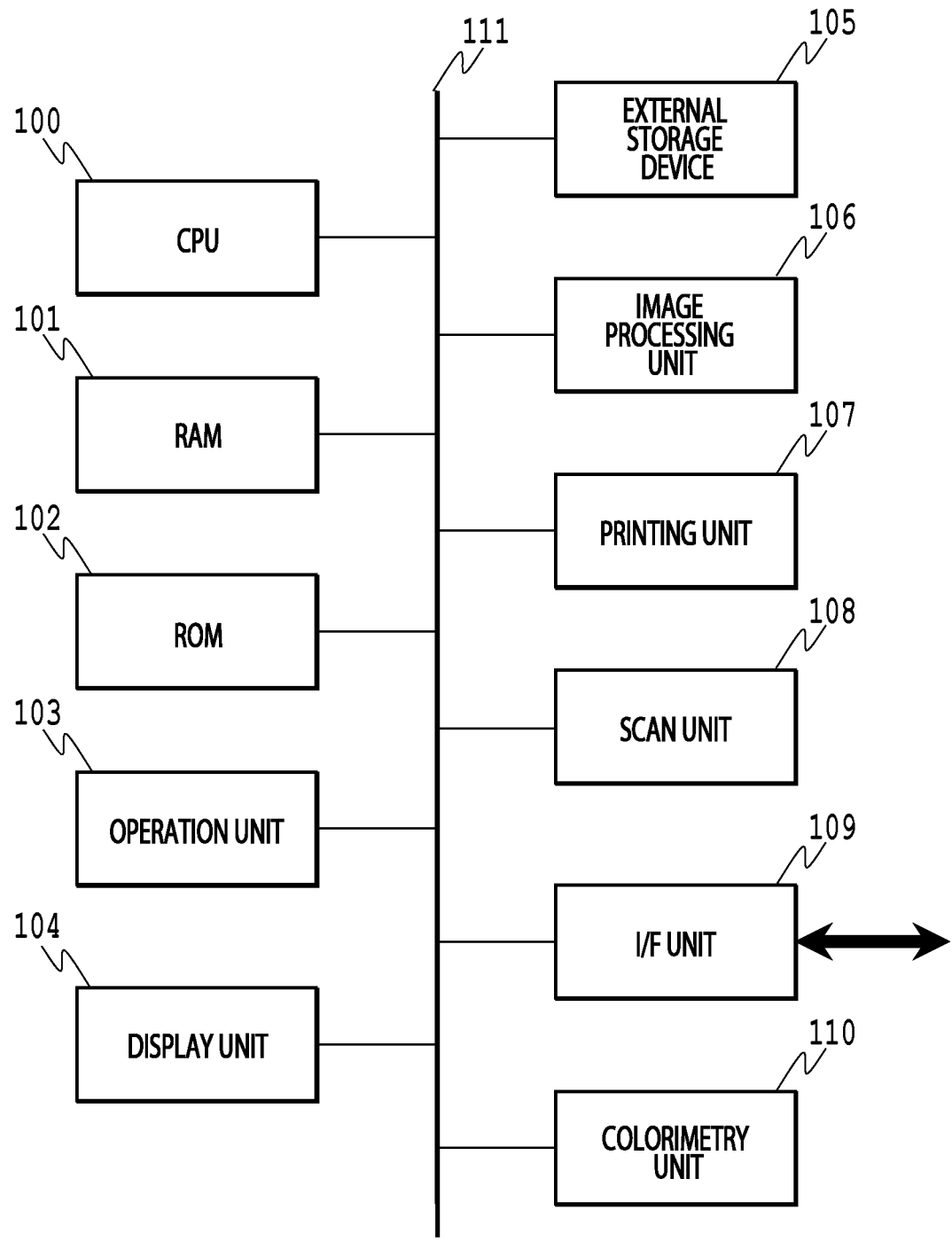
FIG. 1 is a diagram showing a hardware configuration of an image forming apparatus.

FIG. 1 is a diagram showing a hardware configuration of an ink jet printer as an image forming apparatus according to the present embodiment. The image forming apparatus in the present embodiment comprises a CPU 100, a RAM 101, a ROM 102, an operation unit 103, a display unit 104, an external storage device 105, an image processing unit 106, a printing unit 107, a scan unit 108, an I/F unit 109, a colorimetry unit 110, and a bus 111. The CPU 100 controls the operation of the entire image forming apparatus by loading input data and computer programs stored in the ROM 102 and the external storage device, to be described later, onto the RAM 101 and executing them. For example, the CPU 100 generates image data in the bitmap format of each page by interpreting PDL data included in an input print job. Here, a case where the CPU 100 controls the entire image forming apparatus is explained as one example thereof, but it may also be possible to control the entire image forming apparatus by a plurality of pieces of hardware sharing processing. The RAM 101 temporarily stores computer programs and data read from the external storage device 105 and data received from the outside via the I/F unit 109. Further, the RAM 101 is used as a storage area at the time of the CPU 100 performing arithmetic processing and as a storage area at the time of the image processing unit 106 performing image processing. The ROM 102 stores setting parameters used to set each unit in the image forming apparatus, boot programs and the like. The operation unit 103 is an input device, such as a keyboard and a mouse, and receives operations (instructions) by an operator. Due to this, it is possible for the operator to input various instructions to the CPU 100. The display unit 104 is a display device, such as a CRT and a liquid crystal screen, and displays processing results by the CPU 100 in images, characters and the like. In a case where the display unit 104 is a touch panel capable of detecting a touch operation, it may also be possible for the display unit 104 to function as part of the operation unit 103. The external storage device 105 is a large-capacity storage device, typically such as a hard disk drive. In the external storage device 105, computer programs, data and the like used to cause the OS and the CPU 100 to perform various types of processing are stored. Further, in the external storage device 105, temporary data (for example, image data that is input and output, threshold value matrices used by the image processing unit 106 and the like) that is generated by the processing of each unit is also stored. The computer programs and data stored in the external storage device 105 are read appropriately in accordance with the control by the CPU 100 and loaded onto the RAM 101 to be taken as the target of the processing by the CPU 100. The image processing unit 106 is implemented as a processor or a dedicated image processing circuit capable of executing computer programs and performs various types of image processing for converting image data that is input as a printing target into image data that can be output by the printing unit 107. It may also be possible to use a configuration in which the CPU 100 performs various types of image processing as the image processing unit 106, in place of preparing a dedicated processor as the image processing unit 106. The printing unit 107 forms an image on a sheet as a printing medium by using ink as a color material based on image data received directly from the image processing unit 106 or via the RAM 101 or the external storage device 105. Details of the printing unit 107 will be described later. The scan unit 108 is an image sensor (line sensor or area sensor) for optically reading an image formed on a sheet by the printing unit 107. Details of the scan unit 108 will be described later. The I/F unit 109 functions as an interface for connecting the image forming apparatus and an external device. Further, the I/F unit 109 also functions as an interface for performing transmission and reception of data with a communication device by using infrared communication, wireless LAN (Local Area Network) or the like, for connecting to the internet, and so on. Due to this, the I/F unit 109 receives printing-target image data from, for example, an external PC (not shown schematically). The colorimetry unit 110 is a colorimeter for measuring the color of an image formed on a sheet by the printing unit 107. Details of the colorimetry unit 110 will be described later. Each of the above-described units is connected to the bus 111 and capable of performing transmission and reception of data via the bus 111.

The hardware configuration shown in FIG. 1 is one example and it may also be possible for the image forming apparatus to have a hardware configuration whose contents are different from those shown in FIG. 1. For example, a configuration may be acceptable in which the printing unit 107 is connected via the I/F unit 109. Further, it may also be possible to adopt a configuration in which colorimetric information is obtained from an external colorimeter via the I/F unit 109, in place of the configuration in which the colorimetry unit 110 is comprised as part of the image forming apparatus.

<Details of Printing Unit>

The printing unit 107 comprises, as shown in FIG. 2A, print heads 201 to 204 corresponding to black (K), cyan (C), magenta (M), and yellow (Y), respectively. Each of the print heads 201 to 204 is a so-called full-line type and in which a plurality of nozzles for ejecting ink is arrayed along a predetermined direction in a range corresponding to the full width of a sheet 206. Each of the print heads 201 to 204 has, as shown in FIG. 2B, a configuration in which a plurality of head modules is arranged in such a manner that one is arranged on the lower side, the next is on the upper side, the next is on the lower side, and so on, in the sheet conveyance direction. FIG. 2C is an enlarged diagram of a head module 201a and shows that the head module 201a further includes a plurality of chip modules 201a-1 to 201a-5. Each chip module is connected to each substrate independent of one another. FIG. 2D is an enlarged diagram of the chip module 201a-1 and in which 16 nozzles exist. In the present embodiment, explanation is given on the assumption that the resolution of the arrangement of nozzles in the print heads 201 to 204 of each of CMYK is 1,200 dpi.

The sheet 206 as a printing medium is conveyed in one direction indicated by an arrow 207 in FIG. 2A by a conveyance roller 205 (and another roller, not shown schematically) rotating by the driving force of a motor (not shown schematically). Then, while the sheet 206 is being conveyed, an image of one raster corresponding to the nozzle row of each of the print heads is formed sequentially by ink being ejected from a plurality of nozzles of each of the print heads 201 to 204 in accordance with print image data. By repeating the operation to eject ink from each of the print heads 201 to 204 for the sheet 206 that is conveyed as described above, for example, it is possible to form an image corresponding to one page on the sheet.

<Details of Scan Unit and Colorimetry Unit>

The scan unit 108 optically reads the sheet 206 that is conveyed and stores in the external storage device 105 as read image data (scanned data). As shown in FIG. 2A, the scan unit 108 includes line sensors 208a and 208b, which are arranged so as to cover the entire surface of the sheet 206 while partially overlapping each other. The line sensors 208a and 208b sequentially capture the sheet 206 that is conveyed and stores in the external storage device 105 as two-dimensional image data including RGB information and luminance information. At this time, the resolution of the image data is, for example, 600 dpi both in the x-direction and in the y-direction in FIG. 2A. Alternatively, the resolution in the x-direction may be different from the resolution in the y-direction, such as that the resolution in the x-direction is 1,200 dpi and the resolution in the y-direction is 600 dpi. In the present embodiment, the configuration is such that the full width of the sheet 206 is covered by overlapping the two line sensors each other, but a configuration may be acceptable in which the full width of the sheet 260 is covered by, for example, sliding one line sensor. Alternatively, it is not necessarily required to cover the full width of the sheet 206.

The colorimetry unit 110 is arranged on the downstream side of the scan unit 108 and measures the color at a predetermined y-position of the sheet 206 that is conveyed while performing a scan in the x-direction and stores in the external storage device 105 as spectral reflectance data. Alternatively, the colorimetry unit 110 stores the color value in a device-independent color space, which is calculated from the spectral reflectance data, in the external storage device 105. Specifically, the colorimetry unit 110 stores spectral reflectance data at intervals of 10 nm from 380 to 780 nm, which is a visible light range, and the spectral reflectance data after converting them into data in a color space, such as CIE XYZ, CIE Lab, sRGB, or AdobeRGB. Here, while the colorimeter 209 performs a scan in the sensor direction, the conveyance of the sheet 206 (paper feed in the y-direction) is stopped. That is, after the scan and colorimetry for a certain measurement area are completed, the sheet 260 is conveyed by a predetermined amount and the scan and colorimetry for another measurement area are performed. By repeating the conveyance of the sheet 260 and the scan and colorimetry by the colorimeter 209 as above, the colorimetric value corresponding to each measurement area is obtained. At this time, in order to avoid the sheet conveyance control and the apparatus configuration from becoming complicated, it is also possible to perform colorimetry by moving the sheet 206 to a conveyance path different from the conveyance path for printing and image capturing. Alternatively, a configuration may also be possible in which the colorimeter is prepared separately outside the image forming apparatus and colorimetry is performed for the sheet 206 by the colorimeter, and then, the obtained colorimetric data is input via the I/F unit 109. The time interval of colorimetry by the colorimetry unit 110 is generally longer than the interval of reading (interval of scanning) of the scan unit 108 and for example, the interval of colorimetry in the y-direction is five times/inch. Further, the spectral reflectance data, which is colorimetry results, is obtained as the reflectance averaged within the opening shape of the colorimeter 209, for example, within a circle with a diameter q of 3.5 mm.

Both the scan unit 108 and the colorimetry unit 110 are required only to be on the downstream side of the printing unit 107 and for example, a configuration is also possible in which the colorimetry unit 110 is installed on the upstream side of the scan unit 108.

<Details of Image Processing Unit>

Figure 3:
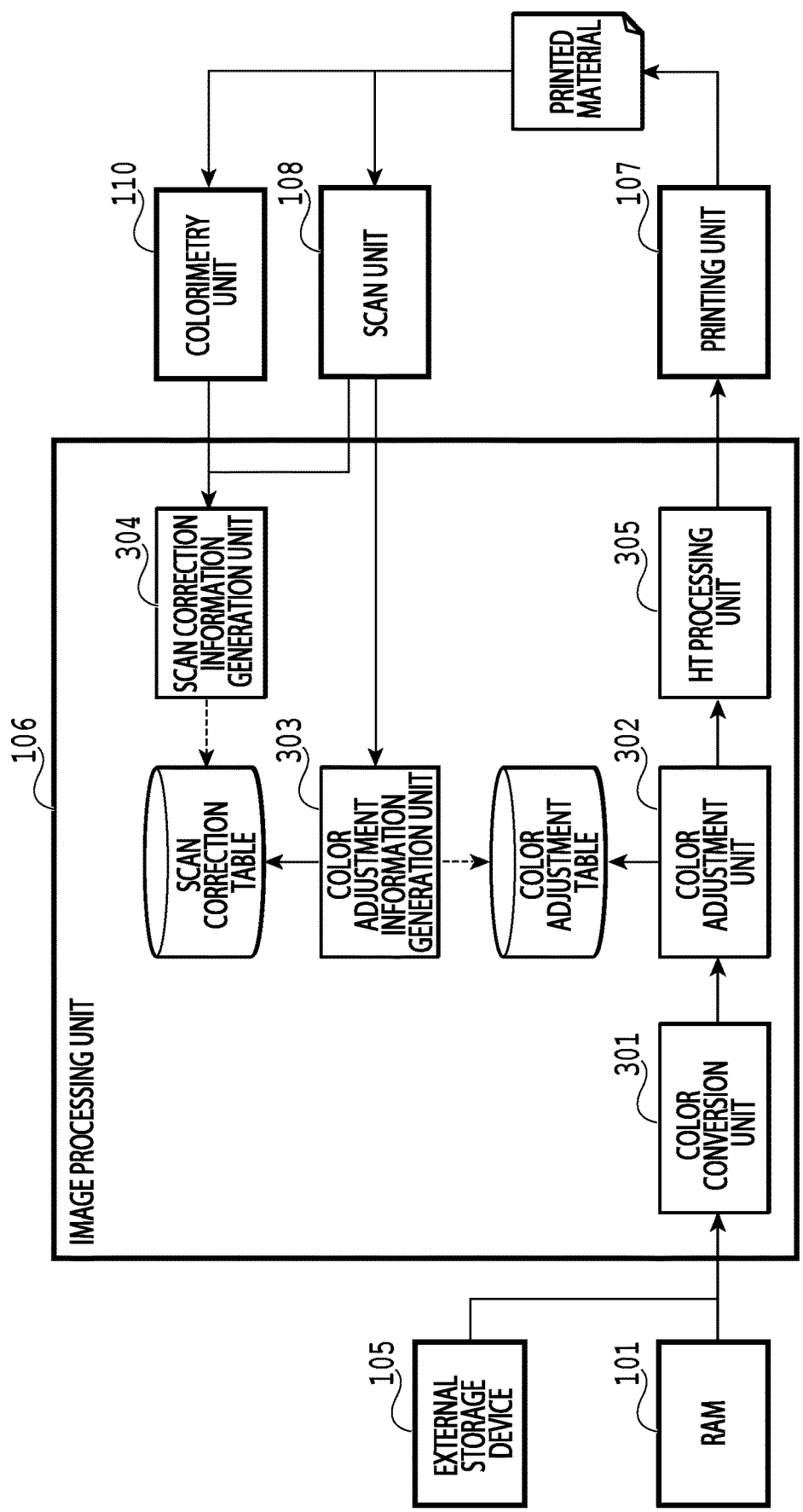
FIG. 3 is a diagram showing an internal configuration of an image processing unit.

FIG. 3 is a diagram showing the internal configuration of the image processing unit 106. In the following, with reference to FIG. 3, the function of the image processing unit 106 is explained in detail. The image processing unit 106 has a color conversion unit 301, a color adjustment unit 302, and a halftone processing unit (in the following, described as "HT processing unit") 305. Further, the image processing unit 106 has a color adjustment information generation unit 303 and a scan correction information generation unit 304.

The color conversion unit 301 converts input image data into image data in accordance with the ink colors that are used in the printing unit 107. For this conversion, it is possible to use a publicly known method, for example, such as matrix arithmetic processing and processing using a three-dimensional LUT (lookup table). The input image data has 8-bit coordinate values (R, G, B) in a color space, such as sRGB, which are, for example, representation colors of a monitor, and the color-converted image data has an 8-bit color signal value of each of CMYK in accordance with the printing unit 107. That is, by the color conversion processing, RGB data is converted into CMYK data. The CMYK data represents an amount (ejection amount) of ink to be used of each ink that is ejected onto the paper surface in order for the printing unit 107 to represent an image. The input image data is not limited to RGB data and may be CMYK data. Even in a case where CMYK data is input from the beginning, it is preferable to perform conversion processing using a four-dimensional LUT that converts input CMYK data into C'M'Y'K' data for limiting the total amount of ink and for color management.

The color adjustment unit 302 performs color adjustment processing (head shading correction processing) that takes into consideration the ink ejection unevenness of each of the print heads 201 to 204 for the color-converted CMYK data by referring to a color adjustment table generated by the color adjustment information generation unit 303. FIG. 4 shows one example of a color adjustment table (head shading correction table). In the color adjustment table shown in FIG. 4, the adjusted color signal value (output color signal value) corresponding to each input color signal value (0, 16, 32, . . . , 240, 255) is stored for each of the print heads 201 to 204. For example, in the data corresponding to the ink color K of the CMYK data, in a case where the input color signal value of the pixel corresponding to the head module 201a is "32", the color signal value of the pixel, which has been adjusted by the color adjustment processing, is "28". It is also possible to perform the color adjustment processing for each head module, each chip module, or each nozzle in place of performing for each print head. Further, it is also possible to perform the color adjustment processing for each nozzle block obtained by dividing nozzles into blocks each including a predetermined number of nozzles, for example, for each nozzle block including eight nozzles. In a case where the color adjustment processing is performed for each nozzle, the color adjustment information generation unit 303 generates a color adjustment table having the number of columns equal to the number of nozzles. For an input color signal value that is not predefined in the color adjustment table shown in FIG. 4, the input color signal values in the vicinity of the input color signal value that is not predefined are identified from the predefined input color signal values and the output color signal value for the input color signal value that is not predefined is calculated from those of the identified input color signal values by using interpolation processing. It is of course possible to store output color signal values for all the input color signal values in place of using interpolation processing. It is also possible to perform the color adjustment processing by using function transformation or matrix transformation in place of a table method.

The color adjustment information generation unit 303 generates the above-described color adjustment table by receiving scanned data of a chart (in the following, called "HS chart") for generating a color adjustment table (head shading correction table) from the can unit 108.

The scan correction information generation unit 304 generates a table (in the following, called "scan correction table") that is referred to in sensor shading correction processing. For this generation, the scanned data of the HS chart, which is received from the scan unit 108, and colorimetric data of a chart (in the following, called "SS chart") for generating the scan correction table, which is received from the colorimetry unit 110, are used. FIG. 5 shows one example of the scan correction table. In FIG. 5, the corrected sensed value corresponding to each sensed value (0, 16, 32, . . . , 240, 255) included in the scanned data is stored in correspondence with the pixel position (0, 100, 200, 300, 400, . . . , 3500, . . . ) in the x-direction. For example, in a case where the sensed value at the pixel position "100" is "32", the sensed value (SS corrected value) for which sensor shading correction processing has been performed is "39". For a sensed value that is not predefined in the scan correction table shown in FIG. 5, the SS corrected value is calculated by interpolation processing using the SS corrected values corresponding to the adjacent sensed values among the predefined sensed values. Similarly, for the sensed value at a pixel position that does not exist in the scan correction table, the SS corrected value is also calculated by interpolation processing using the SS corrected values corresponding to the adjacent sensed values among the predefined sensed values. It is of course possible to store the SS corrected values corresponding to all the sensed values and all the pixel positions without using interpolation processing. As in the case of the color adjustment table, in the scan correction table, it is also possible to perform the sensor shading correction processing by function transformation or matrix transformation in place of a table method.

The HT processing unit 305 generates data of a halftone image (in the following, described as "HT image data") represented by halftone dots that the printing unit 107 can represent by performing halftone processing for each color plane for the color-adjusted CMYK data. By this halftone processing, binary HT image data in which each pixel has a value of "0" or "1" is generated for each color plane of CMYK. For the halftone processing, it may be possible to apply a publicly known method, such as the dither method and the error diffusion method.

<Processing Flow of Image Processing Unit>

Figure 6:
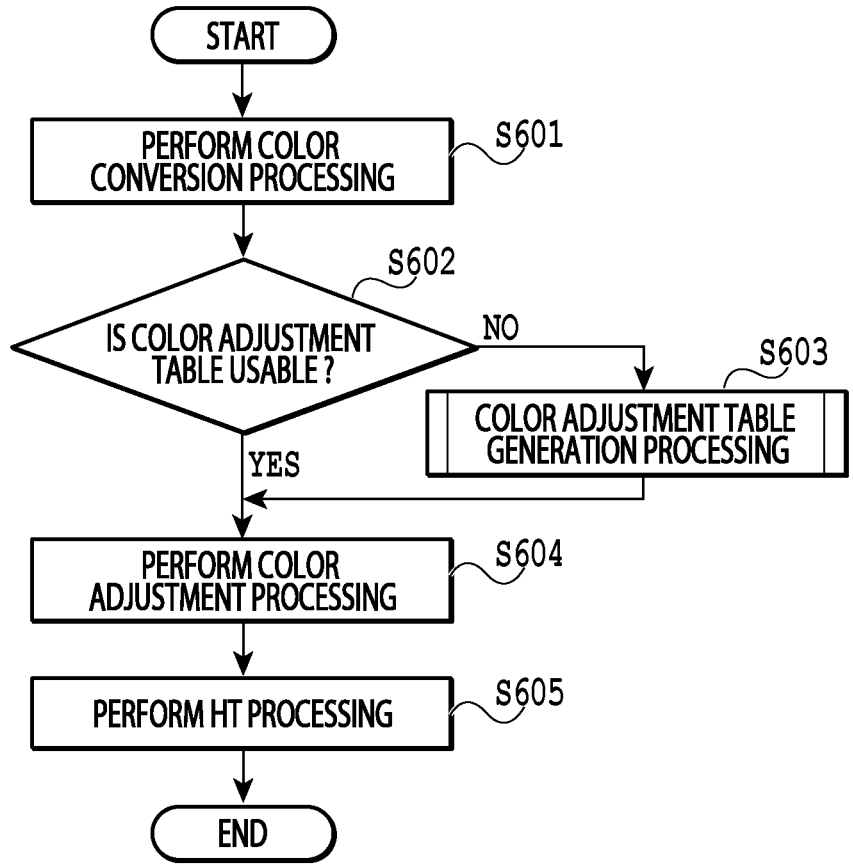
FIG. 6 is a flowchart showing a flow of processing in the image processing unit.

Next, each piece of processing that is performed by the image processing unit 106 is explained along the flowchart shown in FIG. 6. In a case where a user inputs a print job to the image forming apparatus through the operation unit 103, printing-target image data (bitmap image of each page) and printing conditions are loaded onto the RAM 101. Then, the series of processing shown in the flowchart in FIG. 6 is started and performed for each page. Here, the print job is information on instructions for print processing and includes, in addition to PDL data predefining contents to be printed for each page, information on the number of copies and the printing sheet, information on the print mode, and printing conditions, such as single-sided printing/double-sided printing, Nin1 and the like. In the information on the sheet, the maker name, the model number and the like are included, in addition to the sheet type, such as plain paper and glossy paper, and the sheet size, such as A4 and A3. Further, in the information on the print mode, the designation of a high coloring mode in which the conveyance speed is reduced and the amount of ink is increased and an ink-saving mode in which the conveyance speed is increased and the amount of ink is reduced is included. In the following explanation, a symbol "S" means a step.

At S601, the color conversion unit 301 converts RGB data, which is input image data, into CMYK data by performing color conversion processing.

At next S602, the color adjustment unit 302 determines whether or not it is possible to use a color adjustment table satisfying the printing conditions designated in the print job. Specifically, in a case where there exists a color adjustment table in the external storage device 105 or the like, which corresponds to the maker name, the model number, and the sheet type of the designated sheet, or the contents of the designated print mode, the color adjustment unit 302 determines that it is possible to use a color adjustment table satisfying the printing conditions. On the other hand, in a case where a color adjustment table whose maker name, the model number and the like match the maker name, the model number and the like of the designated sheet does not exist in the external storage device 105 or the like, the color adjustment unit 302 determines that there is not a color adjustment table that can be used. The reason is that the correction amount for correcting the nozzle characteristics is supposed to be inappropriate for the designated sheet. Consequently, in a case where there is no concern that the correction amount for correcting the nozzle characteristics is inappropriate, it may also be possible to determine that the color adjustment table can be used even though part of the printing conditions are not satisfied. For example, the sheet basis weight and the sheet size do not affect the correction amount so much, and therefore, it is possible to determine that the color adjustment table satisfying the printing conditions is in the usable state even though the basis weight and the size are different from those of the sheet at the time of the generation of the stored color adjustment table. In a case where a new type of sheet is set, whose paper quality is different from that of the sheet at the time of the generation of the stored color adjustment table, it is preferable to derive the correction amount for head shading correction by using the newly set sheet. Further, it may also be possible to take into consideration the elapsed time from the generation and whether or not the head cleaning processing has been performed. That is, in a case where the color adjustment table in accordance with the designated sheet is already generated and stored and a predetermined time has elapsed from the generation, it may also be possible to determine that there is not a color adjustment table that can be used. Alternatively, in a case where the head cleaning processing has been performed after the generation, it may also be possible to determine that there is not a color adjustment table that can be used. Further, it may also be possible for a user to determine whether or not the table can be used and store flag information indicating the results of the determination and perform determination based on the flag information. In that case, it is sufficient for a user to set a flag through the operation unit 103 at timing at which a new sheet is set or the head is replaced with another. Alternatively, it may also be possible to set a flag by checking the results of test printing by visual inspection. In a case where the determination results indicate that a color adjustment table that can be used exists in the external storage device 105 or the like, the processing advances to S604. On the other hand, in a case where it is determined that there is not a color adjustment table that can be used, the processing advances to S603.

At S603, the color adjustment information generation unit 303 generates a color adjustment table satisfying the printing conditions designated in the print job. Details of the color adjustment table generation processing will be described later.

At S604, the color adjustment unit 302 performs color adjustment processing for the CMYK data obtained by the color conversion at S601 by using the appropriate color adjustment table that can be used. Here, it is assumed that the density of an image that is formed by the head module 201a in a case where the input color signal value is "32" is relatively high compared to the target density or the density that is formed by another print head. In this case, by changing the pixel value of the input image data to a smaller value (for example, "28"), it is possible to reduce the probability that dots are formed by the head module 201a in a case where the input color signal value is "32". By the processing such as this, it is possible to reduce the difference from the target density and another print head. In the present embodiment, the color adjustment table as shown in FIG. 4 described previously is generated and stored in advance for each of a variety of types of sheet and for each print mode. Then, in a case where there is not a color adjustment table in accordance with the sheet and the print mode designated in the print job, a color adjustment table is generated newly. In this manner, the change in density that occurs in each print head and each print nozzle is suppressed.

At S605, the HT processing unit 305 performs halftone processing for the color-adjusted CMYK data. The generated HT image data is sent to the printing unit 107 and in the printing unit 107, print processing is performed based on the HT image data.

The above is the contents of the processing in the image processing unit 106. The processing such as this is performed each time a print job is input and it is possible to print the designated number of sheets of the image designated by a user. In the determination at S602, in a case where the model number and the maker name of the sheet are different, but the sheet type is the same, it may also be possible to determine that the color adjustment table can be used. For example, such a case is where even though the coated paper is designated, the coated paper of the same maker has run out, and therefore, replenishment is performed with the coated paper of another maker. In the case such as this, on a condition that it is known empirically that there is no problem, it may also be possible to enable the application of the color adjustment table used before the replenishment as it is.

<Color Adjustment Table Generation Processing>

Figure 7:
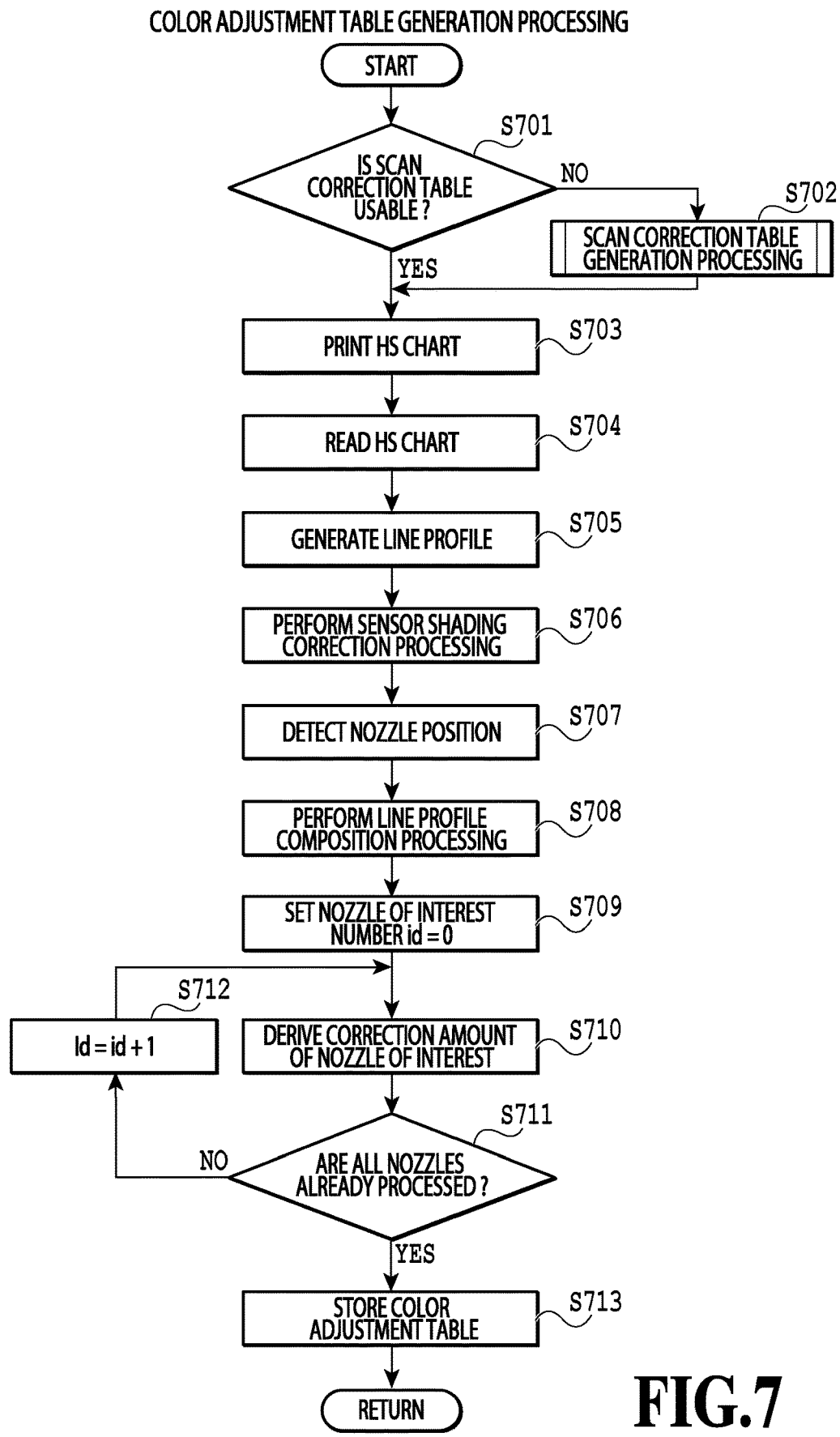
FIG. 7 is a flowchart showing a flow of color adjustment table generation processing.

Following the above, with reference to the flowchart in FIG. 7, the color adjustment table generation processing at S603 described above is explained in detail. The following explanation is given by taking a case as an example where a color adjustment table is generated for each nozzle.

First, at S701, whether or not it is possible to use a scan correction table satisfying the printing conditions designated in the print job is determined. The reference at the time of this determination may be the same as the reference shown at S602 in the flowchart in FIG. 6 described previously. The reason is that as in the case of the color adjustment table, for the scan correction table also, the correction amount for correcting the sensor reading characteristics may be different depending on the sheet to be used and the print mode. Consequently, in a case where a new type of sheet is used, it is preferable to derive in advance a correction amount for sensor shading correction processing with the new type of sheet. However, the spectral characteristics are hardly affected by the sheet basis weight and the sheet size, and therefore, it may also be possible to permit these differences and perform determination by using a bit less strict reference. It may also be possible to take into consideration the elapsed time from the generation and this is the same as at S602 described previously. That is, only in a case where there is a scan correction table whose elapsed time from its generation is within a predetermined time, it may be possible to determine that there is a scan correction table that can be used. The reason is that there is a case where the color of the filter inside the sensor changes or the spectral characteristics of the illumination change as time elapses and there is a possibility that the scan correction table is no longer suitable to the sensor having changed such as this. In a case where the results of the determination indicate that there is a scan correction table that can be used, the processing advances to S703. On the other hand, in a case where there is not a scan correction table that can be used, the processing advances to S702 and processing to newly generate a scan correction table is performed. Details of the scan correction table generation processing at S702 will be described later.

Figure 8:
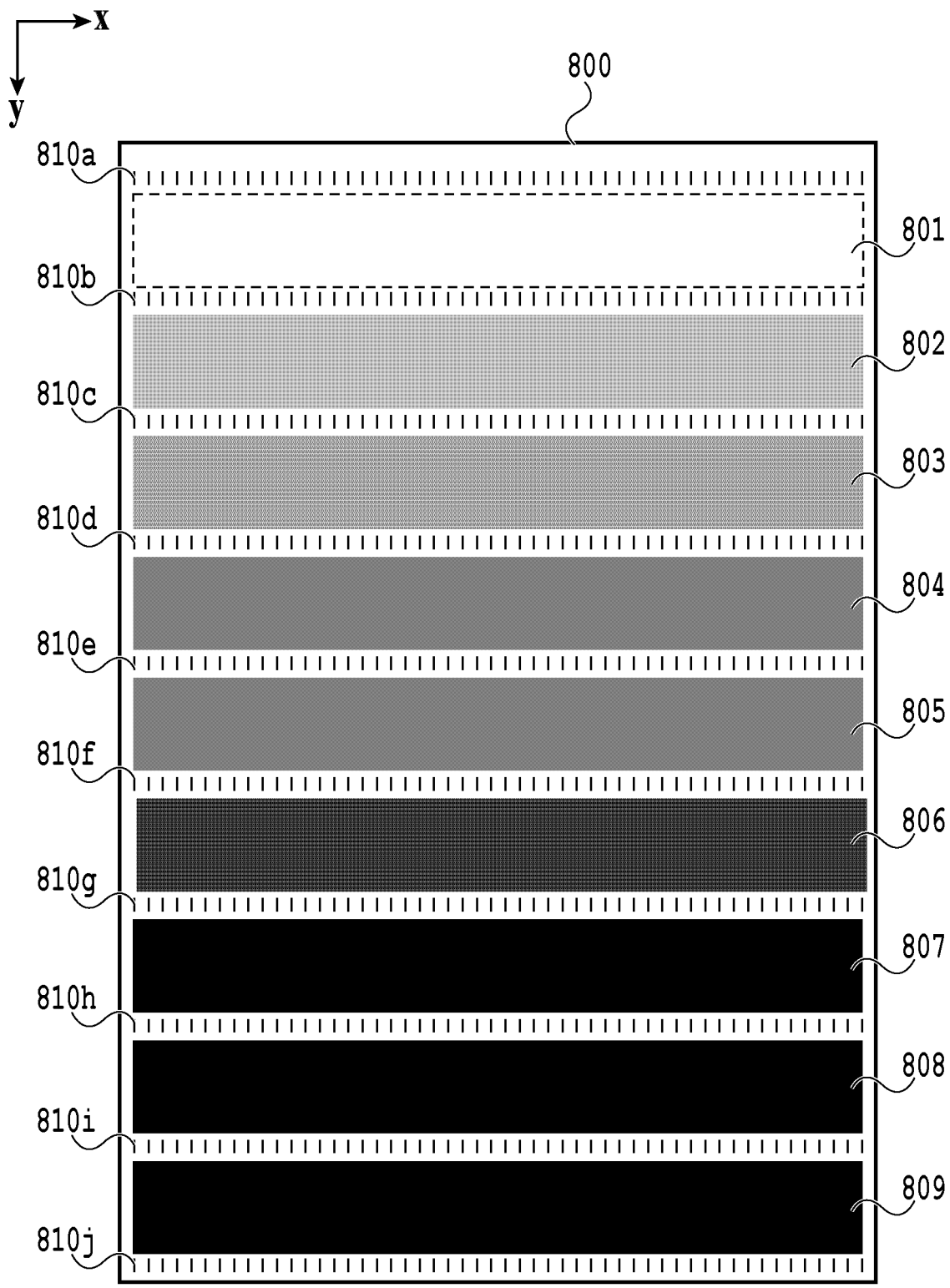
FIG. 8 is a diagram showing one example of an HS chart.

At S703, the HS chart is printed and output. Specifically, the image data of the HS chart stored in the external storage device 105 or the ROM 102 is read, the HT processing unit 305 performs halftone processing, and the printing unit 107 performs print processing by using the generated HT image data. FIG. 8 shows one example of the HS chart. In the HS chart, a pattern area for adjusting the nozzle position to the reading position exists, in addition to the measurement area for obtaining the density characteristics of each nozzle. In a case of an HS chart 800 in FIG. 8, nine patches (measurement areas) 801 to 809 exist, whose tones are different from one another, and each patch extends in the main scanning direction substantially perpendicular to the conveyance direction of the sheet and has a uniform density. In addition, position adjustment patterns 810*a* to 810*j* are arranged outside the patch so as to sandwich each of the measurement areas 801 to 809. A position adjustment pattern 810 is generally called "ruler" and includes a plurality of thin lines (each line has a predetermined length in the y-direction) formed at predetermined intervals in the x-direction.

At S704, the scanned data of the printed and output HS chart is obtained. Specifically, the HS chart for which the print processing has been performed by the printing unit 107 is read by each of the line sensors 208*a* and 208*b* configuring the scan unit 108 and the scanned data of the HS chart is generated. That is, two pieces of data are generated: scanned data by the line sensor 208*a* and the scanned data by the line sensor 208*b*.

At S705, based on the two pieces of scanned data obtained at S704, a line profile corresponding to each of the line sensors 208*a* and 208*b* is generated. Specifically, the measurement area (patch) of the HS chart is identified from the scanned data and one-dimensional data (line profile) is found, which is obtained by averaging the sensed values in the conveyance direction (y-direction). The line profile is obtained by averaging each read value at the different y-position at an identical x-position in each measurement area. In a case where the HS chart 800 shown in FIG. 8 described previously is used, nine line profiles corresponding to the measurement areas 801 to 809 are obtained for each of the line sensors 208*a* and 208*b*.

At S706, for each line profile obtained at S705, sensor shading correction processing based on the pixel position in the x-direction is performed by using a scan correction table that can be used. Here, a case is considered where the sensed value at the pixel position x=50 of the line profile corresponding to the measurement area 808 of the HS chart 800 shown in FIG. 8 is "24" and the sensor shading correction processing is performed by using the scan correction table shown in FIG. 5. In this case, first, the SS corrected values for the sensed value "24" at the pixel positions x=0, 100 are found by the interpolation calculation. Specifically, for the pixel position x=0, from the SS corrected values "29" and "40" corresponding to the sensed values "16" and "32", 29+(40−29)×(24−16)÷(32−16)=34.5 is obtained as the SS corrected value. Similarly, for the pixel position x=100, 32.0 is obtained as the SS corrected value. Then, from the two calculated SS corrected values "34.5" and "32.0", 32.0+(34.5−32.0)×(100−50)÷(100−0)=33.25 is obtained as the SS corrected value for the pixel position x=50. As described above, by finding the SS corrected value at each pixel position in the x-direction based on the scan correction table for each line profile, the line profile for which the sensor shading correction processing has been performed is obtained.

At S707, based on the two pieces of scanned data obtained at S704, the identification number (nozzle number) of the nozzle having passed through each pixel position in the x-direction is identified for each measurement area of the HS chart. Specifically, each image area within the scanned data, which corresponds to each position adjustment pattern 810 of the HS chart 800, is identified and the pixel position in the x-direction on the image in each line profile and the nozzle number are caused to correspond to each other. Specific explanation is given by using FIG. 9. The table shown in FIG. 9 shows the center pixel position in the x-direction in the scanned data of each line configuring the position adjustment patterns 810*a* to 810*j*. It is assumed that the resolution (≈nozzle interval) in the x-direction of the printing unit 107 is 1,200 dpi. It is also assumed that the interval between nozzles forming the line is 16 nozzles. Then, it is assumed that the resolution (≈pixel interval) in the x-direction of the scan unit 108 is 600 dpi. Here, a pixel position X in the x-direction, which corresponds to the nozzle number "016", in the measurement area 801 is considered. First, attention is focused on the pixel position X of the position adjustment patterns 810*a* and 810*b* located over and under the measurement area 801. From the table in FIG. 9, it is known that the coordinate value of the pixel position X for the nozzle number "016" is 720 and 721, respectively. Consequently, the pixel position X corresponding to the nozzle number "016" in the measurement area 801 is their average value=720.5. As in the case of the color adjustment table, it is possible to calculate the pixel position X corresponding to the nozzle number of the nozzle not contributing to the formation of the position adjustment pattern by performing linear interpolation of the coordinate values of the pixel positions in the x-direction, which are obtained from the nozzle numbers of the adjacent nozzles contributing to the formation of the position adjustment pattern. In this manner, for each line profile, the pixel positions in the x-direction are identified, which correspond to all the nozzle numbers.

Figure 10A:
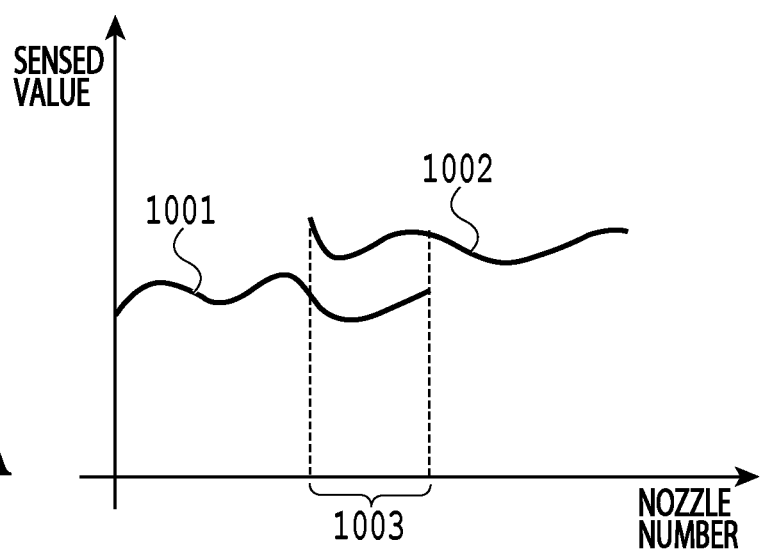
FIG. 10A to FIG. 10C are each a diagram explaining line profile composition processing.
Figure 10B:
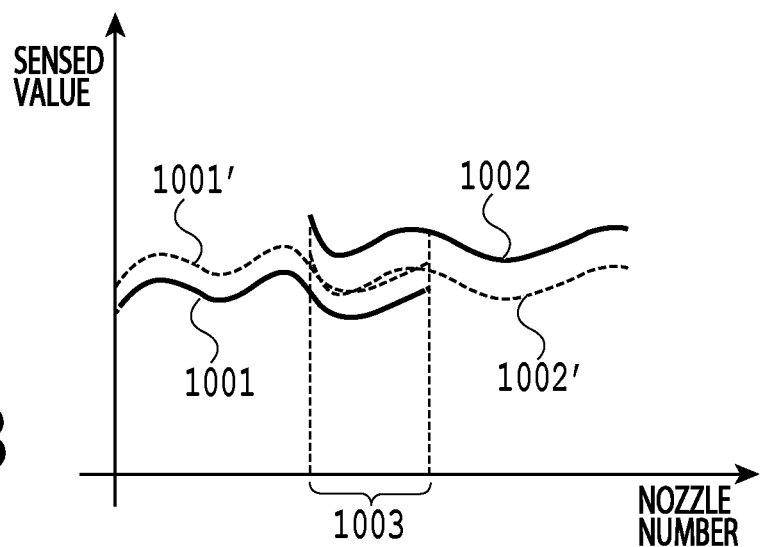
Figure 10C:
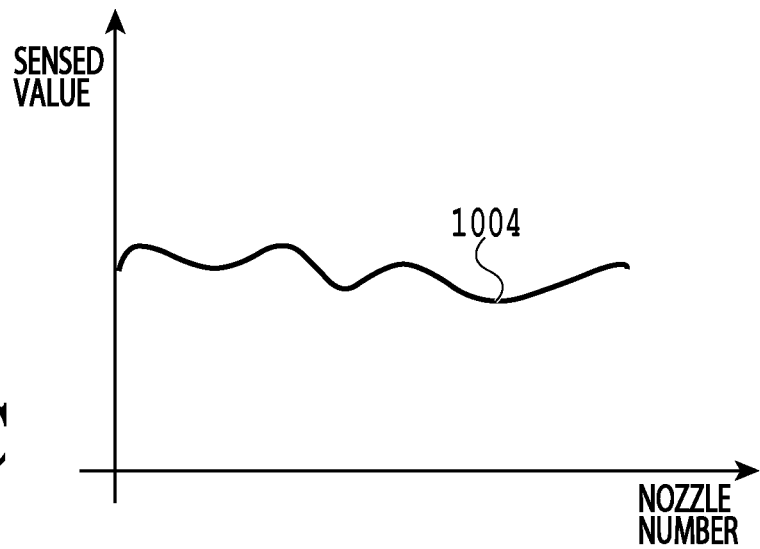

At S708, processing to compose the line profiles obtained from the scanned data of each of the line sensors 208*a* and 208*b* is performed. Here, with reference to FIG. 10A to FIG. 10C, line profile composition processing is explained. FIG. 10A to FIG. 10C are each a graph in a case where the nozzle number is taken along the horizontal axis and the sensor output value (for example, output value of G sensor) is taken along the vertical axis. In the graph in FIG. 10A, a curve 1001 and a curve 1002 correspond to the line sensors 208*a* and 208*b*, respectively. Specifically, each curve is obtained by plotting the line profile obtained by reading the same measurement area with each sensor for the corresponding nozzle number. The line sensors 208*a* and 208*b* are arranged so that part of them overlap in the sensor column direction (x-direction) (see FIG. 2A). Because of that, the curve 1001 and the curve 1002 are plotted in an overlapping manner for the nozzle numbers in an overlap range 1003. At this time, as shown in FIG. 10A, there is a case where the sensed value is different due to the characteristics (individual difference) inherent in the line sensor despite the reading of the same measurement area. Consequently, offset is applied so that the average value in the overlap range 1003 are substantially the same. Specifically, processing to add a value uniformly to each sensor output value, subtract a value uniformly from each sensor output value, multiply each sensor output value uniformly by a value, divide each sensor output value uniformly by a value, and so on, is performed. In FIG. 10B, a broken-line curve 1001' indicates the state after the offset is applied to the curve 1001 and a broken-line curve 1002' indicates the state after the offset is applied to the curve 1002. By composing the two curves 1001' and 1002' after the offset, which are obtained as above, a composite curve 1004 shown in FIG. 10C is obtained. In the composition, it is sufficient to adopt the average values of both curves for the overlap range 1003 in the two curves 1001' and 1002' after the offset and use the values after the offset as they are shown by each of the curves for the portion other than the overlap range (non-overlap range). However, in a case where the average value in the overlap range is found, it is desirable to perform weighting, for example, such as that a heavier weight is assigned to a portion closer to the center portion, so that the overlap range and the non-overlap range are connected smoothly. By performing the processing such as this for each of the measurement areas 801 to 809, it is possible to obtain nine composite line profiles for each measurement area.

At S709, the nozzle number of the nozzle of interest (nozzle of interest id) among all the nozzles arrayed in the x-direction is initialized. Specifically, the nozzle of interest id=0 is set.

Figure 11A:
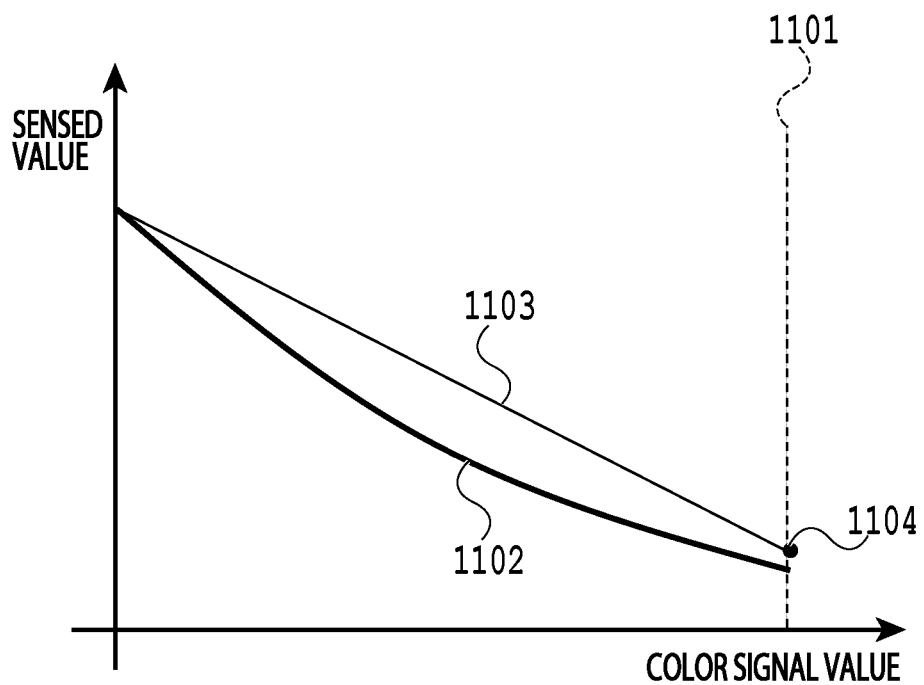
FIG. 11A is a diagram showing one example of a measured curve and FIG. 11B is a diagram explaining a correction amount calculation process.
Figure 11B:
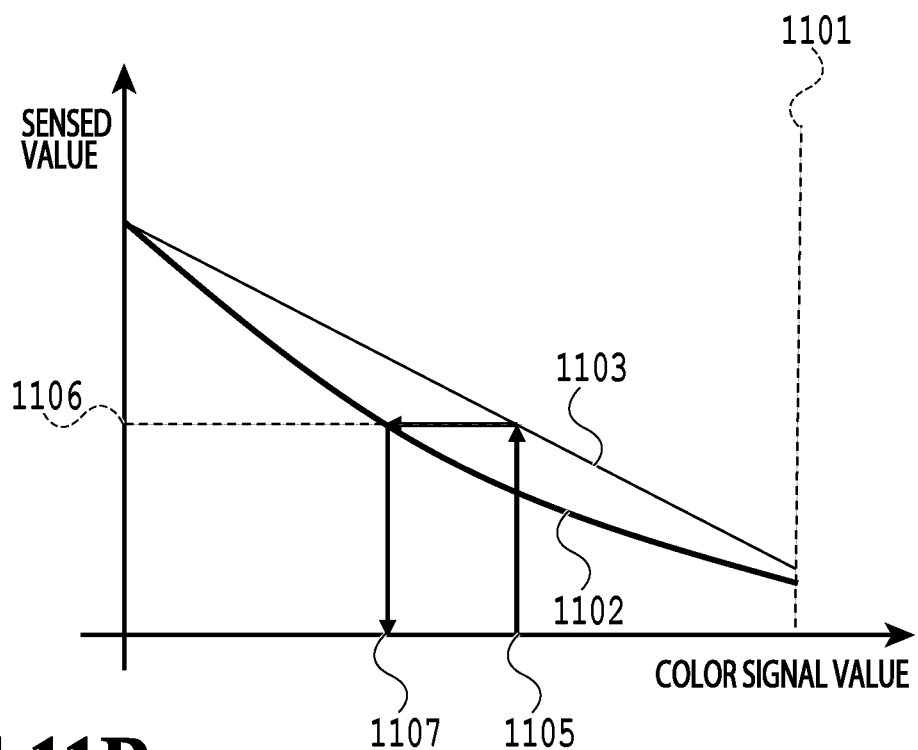

At S710, the correction amount for the current nozzle of interest id is derived and the adjusted color signal value for the nozzle of interest is determined. Specific explanation is given by using the drawings. First, for the generation of the color adjustment table, a measured curve corresponding to the nozzle of interest is calculated. Here, the measured curve is a curve indicating a relationship between the color signal value of the target measurement area and the sensed value at the pixel position corresponding to the nozzle of interest on each line profile. FIG. 11A shows an example of the measured curve. The horizontal axis in FIG. 11A represents the color signal value of an image that is formed on a sheet by the printing unit 107 and the vertical axis represents the sensed value obtained by the scan unit 108 scanning the sheet. A broken line 1101 in FIG. 11A indicates the upper limit value of the horizontal axis and in a case where the input color signal value is an 8-bit value, the upper limit value is "255". A curve 1102 in FIG. 11A is a measured curve obtained by combining the color signal value of the measurement area included in the HT chart and the sensed value corresponding to each tone, and further combining the interpolation calculation. As the interpolation method, it may be possible to use a publicly known method, such as the piecewise linear interpolation and the spline curve. The measured curve 1102 represents the density characteristics of the nozzle corresponding to the pixel position in the x-direction of the scanned data and for example, for the nozzle whose ejection amount is small, the curve shifts in the upward direction (toward the brighter direction). A straight line 1103 in FIG. 11A indicates the ejection characteristics (target ejection characteristics) common to all the nozzles, which is the correction target of each nozzle. It may be possible to set the target ejection characteristics by, for example, finding each value that is linear to a sensed value 1104 corresponding to the maximum color signal value determined in advance. Alternatively, it may also be possible to take the head module, the chip module, or the nozzle to be a reference and set the ejection characteristics of the reference module or nozzle as the target ejection characteristics. Alternatively, it may also be possible to set the ejection characteristics obtained by averaging the ejection characteristics of the head modules, the chip modules, or the nozzles in a predetermined range as the target ejection characteristics. FIG. 11B is a diagram explaining the calculation process of the correction amount. First, the nozzle of interest id and an input color signal value 1105 that is taken to be the target of the correction amount calculation are obtained. Next, a target value 1106 corresponding to the obtained input color signal value 1105 is obtained from the target ejection characteristics 1103 of the nozzle of interest.

Further, from the measured curve 1102 of the nozzle of interest, the tonal value corresponding to the target value 1106 is obtained as an adjusted color signal value 1107. Then, the obtained adjusted color signal value 1107 and the input color signal value 1105 are caused to correspond to each other and stored in the color adjustment table being generated in association with the nozzle of interest. By performing the processing such as this with all the values of 0 to 255 being taken as the input color signal value 1105, it is possible to obtain a table corresponding to all the tonal values for the nozzle of interest. Alternatively, it may also be possible to generate a table corresponding to, for example, nine specific tonal values, by thinning the tonal values. In that case, it may be possible to find the value other than the specific tonal values from the nine specific tonal values by the publicly known interpolation processing.

At S711, whether all the nozzles are already processed as the nozzle of interest is determined. In a case where the nozzle of interest id is larger than or equal to the number of nozzles comprised by the print heads 201 to 204, it is determined that all the nozzles are already processed as the nozzle of interest. In a case where there is an unprocessed nozzle, the processing advances to S712 and the nozzle of interest id is updated, and the processing returns to S710 and the same processing is repeated. On the other hand, in a case where it is determined that all the nozzles are already processed as the nozzle of interest, the processing advances to S713.

At S713, the color adjustment table obtained by the processing up to this point is stored in the external storage device 105. At this time, the color adjustment table is stored in correspondence with information on the sheet, such as the maker name, the model number, and the sheet type of the used sheet, the printing conditions, such as the print mode, and the date of generation.

The above is the contents of the color adjustment table generation processing of each nozzle. By performing the processing such as this for each ink color (C, M, Y, K), the color adjustment table is completed. In the flowchart in FIG. 7, the sensor shading correction processing based on the pixel position in the x-direction is performed for the line profile (S706), but this is not limited. For example, it may also be possible to generate the line profile by performing the sensor shading correction processing for the scanned data of the HS chart read at S704 and detecting the nozzle position thereafter. However, in a case where the conveyance error in the x-direction in the printing unit 107 is a low-frequency error, it is preferable to perform the sensor shading correction processing for the line profile as shown in the flowchart in FIG. 7. For example, such a case is where the conveyance error in the x-direction is smaller than the reading resolution in the x-direction of the scan unit 108 or is estimated to be smaller than the printing resolution in the x-direction of the printing unit 107 in each of the measurement areas 801 to 809 in the HS chart 800 in FIG. 8. In the case such as this, it is recommended to perform the sensor shading correction processing for the line profile. In the case such as this, it is possible to reduce the processing time more by performing the sensor shading correction processing for the line profile than by performing the correction for each pixel of the scanned data of the HS chart. Further, it is also possible to lessen the influence of the noise resulting from the sensor and the halftone processing by the averaging processing at the time of calculating the line profile. On the other hand, in a case where the conveyance error whose magnitude is one or more pixels occurs in the x-direction within each measurement area, the correspondence between the nozzle formed within the measurement areas 801 to 809 and the reading element is different depending on the y-position. Because of this, in the head shading correction processing, it is preferable to generate the line profile by performing averaging while sliding obliquely. On the other hand, it is preferable to perform the sensor shading correction processing based on the position of an imaging element. Consequently, in a case of a shift of one or more pixels, it is preferable to calculate the line profile by performing averaging processing based on the position adjustment pattern 810 after performing the sensor shading correction in accordance with the pixel position in the x-direction in the scanned data of the HS chart.

<Scan Correction Table Generation Processing>

Figures 12A, 12B:
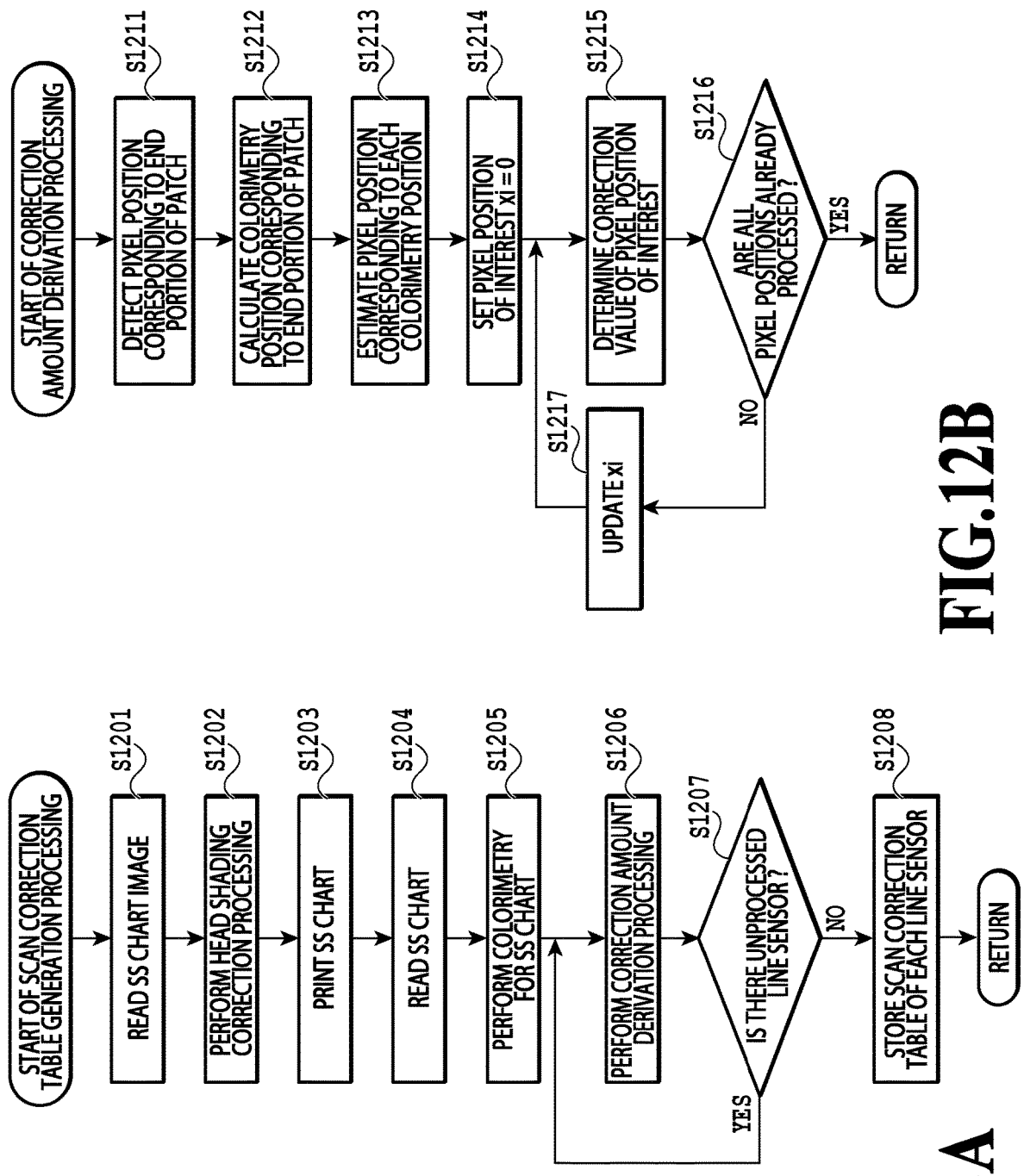
FIG. 12A is a flowchart showing a flow of scan correction table generation processing and FIG. 12B is a flowchart showing a flow of correction amount derivation processing.

Next, with reference to the flowchart shown in FIG. 12A, the scan correction table generation processing at S702 described above is explained in detail.

At S1201, the image data of the SS chart is read from the external storage device 105 or the ROM 102. In the present embodiment, the HS chart 800 shown in FIG. 8 described previously is also utilized as the SS chart. In the sensor shading correction processing, it is also possible to use another chart different from the chart used in the head shading correction processing. For example, there is a case where the color signal values to which great importance should be given are different between the head shading correction processing and the sensor shading correction processing. Consequently, it may also be possible to prepare and use a chart in which the color signal values to which great importance should be given are increased in number and arranged in the sensor shading correction processing. Alternatively, it may also be possible to use a dedicated chart in which only the color signal values to which great importance should be given are arranged.

At S1202, the color adjustment unit 302 performs the head shading correction processing for the image data of the SS chart by using color adjustment information on each nozzle (color adjustment table of each nozzle). The image data of the SS chart, for which the head shading correction has been performed, is converted into a halftone image by being subjected to halftone processing in the HT processing unit 305 and sent to the printing unit 107.

At S1203, the printing unit 107 performs print processing based on the halftone image data of the SS chart. By the processing up to this point, the SS chart from which high-frequency unevenness resulting particularly from the print heads 201 to 204 has been removed is obtained.

At S1204, the scan unit 108 generates scanned data of the SS chart by reading the SS chart output from the printing unit 107 by using the line sensors 208a and 208b. Further, at this time, as at S705 described above, from the obtained two pieces of scanned data, the measurement area (patch) of the SS chart is identified and the line profiles corresponding to the line sensors 208a and 208b respectively are obtained. In addition, the calculation of the pixel position (x-position in the main scanning direction on the patch) corresponding to the position adjustment patterns 810a to 810j is also performed by identifying the position adjustment pattern (ruler) of the SS chart.

At next S1205, the colorimetry unit 110 performs colorimetry for the measurement area of the SS chart output from the printing unit 107. In the present embodiment, by repeating the scan in the sensor column direction (x-direction) of the colorimeter 209 and the paper feed by the conveyance roller 205 in the y-direction perpendicular to the x-direction, colorimetry is performed for each of the measurement areas 801 to 809. Due to this, L*a*b* values at each predetermined colorimetry timing are obtained as the colorimetric values of each measurement area.

At S1206, the scan correction information generation unit 304 performs processing to derive the correction amount at the pixel position (x-position) on each line sensor based on the line profile of the sensed value obtained at S1204 and the colorimetric value obtained at S1205. Details of the correction amount derivation processing will be described later.

At S1207, whether or not the correction amount derivation processing of each line sensor is completed is determined. In the present embodiment, in a case where the correction amount derivation processing corresponding to each of the line sensors 208a and 208b is completed, the processing advances to S1208. On the other hand, in a case where the correction amount derivation processing of one of the line sensors 208a and 208b is not performed yet, the processing returns to S1206 and the correction amount derivation processing for the line sensor of interest is performed.

At S1208, based on the results of the correction amount derivation processing performed for each line sensor, a scan correction table corresponding to each line sensor is generated and stored in the external storage device 105.

The above is the contents of the scan correction table generation processing. It may also be possible to generate the scan correction table only for the color (for example, yellow) that is likely to cause the sensed value to differ between the center portion and the end portion in a uniform patch image. It may of course be possible to generate the scan correction table corresponding to each color by repeating the above-described generation processing for each of all the colors (C: cyan, M: magenta, Y: yellow, K: black). In a case where the scan correction table is generated for all the colors, it may also be possible to change the colorimetric value and the sensed value, which are to be used, for each processing-target color (for example, for K, the L* value and the output value of the G sensor are used, and so on). Alternatively, it is also possible to use a value that is calculated from the colorimetric value, in place of using only one of the sensors or only the colorimetric value. For example, it may also be possible to use the color difference from the L*a*b* values of the sheet itself, or from L*=100, a*=0, b*=0 as the colorimetric value. Further, it may also be possible to use the value obtained by performing 3×3 or 3×1 matrix transformation for the colorimetric value and the sensed value, respectively.

<Correction Amount Derivation Processing>

Following the above, with reference to the flowchart shown in FIG. 12B, details of the correction amount derivation processing at S1206 described above are explained.

Figure 13A:
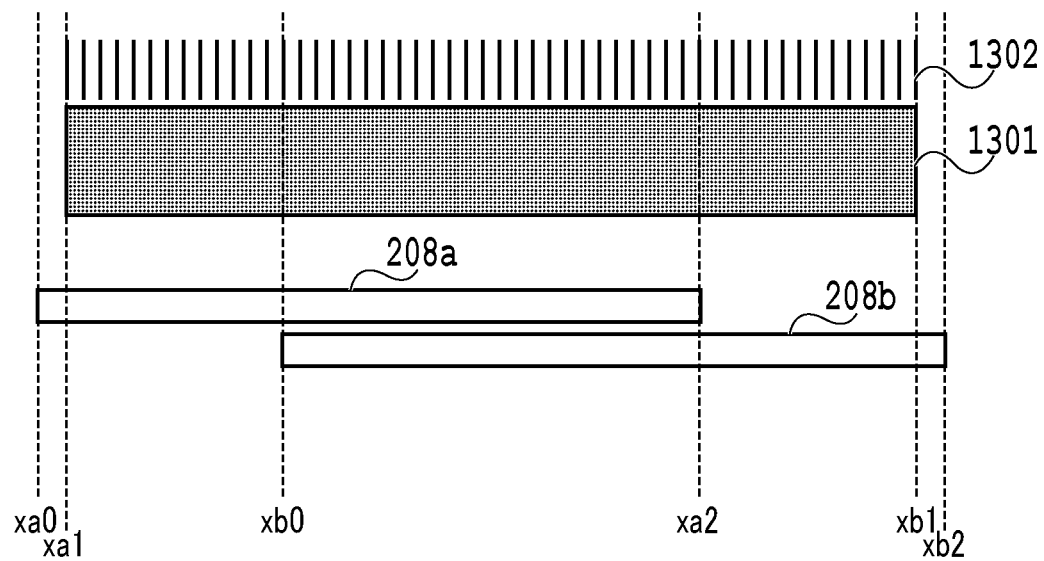
FIG. 13A is a diagram showing a positional relationship between an SS chart and line sensors and FIG. 13B is a diagram showing a positional relationship between the SS chart and the colorimetry position of a colorimeter 209.
Figure 14A:
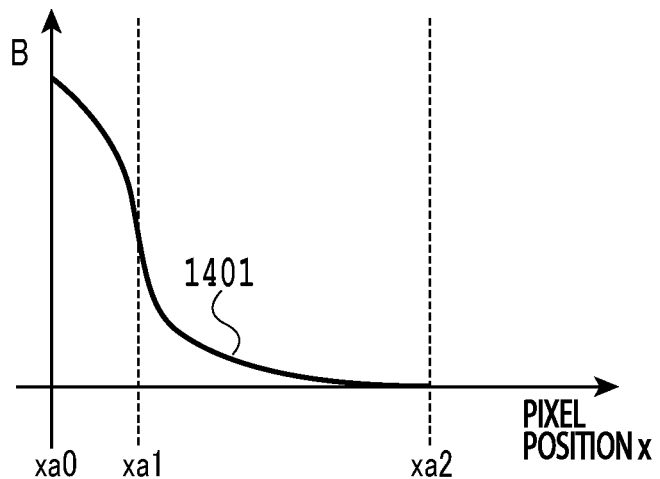
FIG. 14A to FIG. 14C are each a diagram explaining detection of an end portion of a measurement area.
Figure 14B:
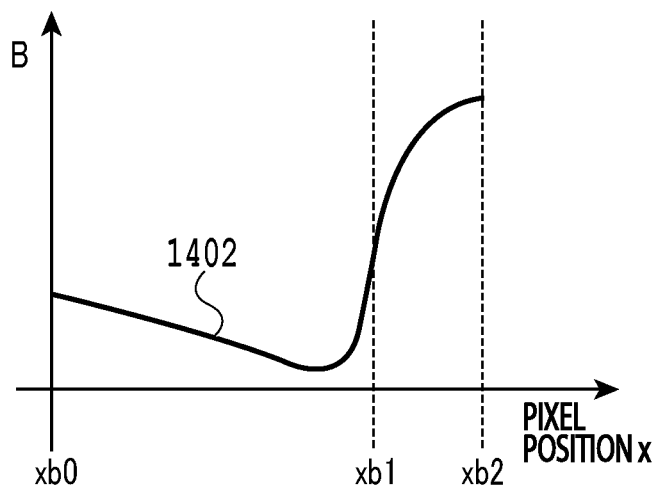

First, at S1211, based on the line profiles corresponding to each of the line sensors 208a and 208b, which are obtained at S1204, the detection of the pixel position corresponding to the end portion of the measurement area of the SS chart is performed. FIG. 13A is a diagram showing a positional relationship between the SS chart and the line sensors 208a and 208b. In FIG. 13A, a rectangular area 1301 represents one of the measurement areas 801 to 809 included in the SS chart and thin lines 1302 continuous at regular intervals represent one of the position adjustment patterns 810a to 810j. The rectangular area 1301 is a pattern for obtaining the difference in characteristics of each sensor for substantially the same color and it is preferable for a patch image whose density is uniform to be formed. In FIG. 13A, xa1 and xb1 each represent the pixel position corresponding to the end portion of the rectangular area 1301 and at this step, the positions corresponding to xa1 and xb1 on the line profiles corresponding to the line sensors 208a and 208b respectively are identified. FIG. 14A is a graph in a case where the sensed value is taken along the vertical axis and the pixel position (x) of the line sensor 208a is taken along the horizontal axis and a solid line 1401 indicates the line profile of the sensor output value (signal value of blue (B) of RGB values) of the line sensor 208a. At this time, from the shape of the solid line 1401, it is possible to estimate the pixel position xa1. In this estimation, for example, the first derivative of the sensor output value B for the pixel position x of the solid line 1401 is calculated for each pixel position and the pixel position at which the absolute value of the derivative is the largest is estimated as the position of xa1. In place of the above-described method, it may also be possible to use the publicly known edge detection filter. Alternatively, it may also be possible to use a threshold value given in advance, or found from the maximum value, the minimum value, the average value or the like of the solid line 1401 and estimate the position as the position of xa1, at which the value is larger than the value at a pixel position xa0 and the value is the minimum among the pixel positions at which the sensor output value is lower than the threshold value. FIG. 14B is a graph in a case where the sensed value is taken along the vertical axis and the pixel position (x) of the line sensor 208b is taken along the horizontal axis and a solid line 1402 indicates the line profile of the sensed value (signal value of blue (B) of RGB values) of the line sensor 208b. At this time, from the shape of the solid line 1402, it is possible to estimate the pixel position xb1.

Figure 13B:
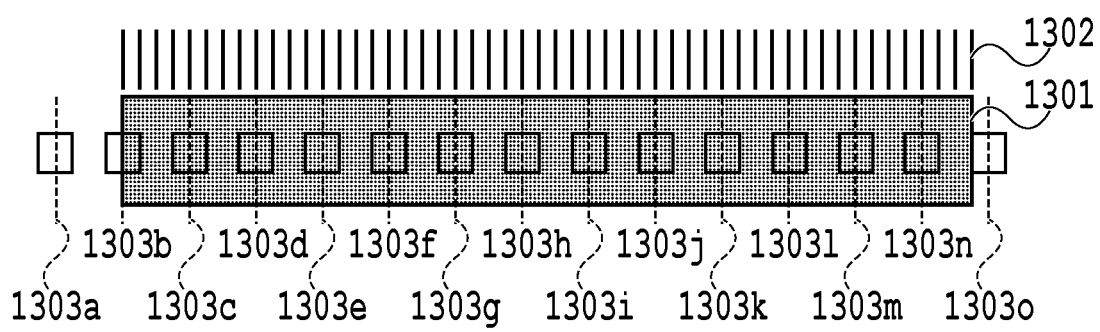
Figure 14C:
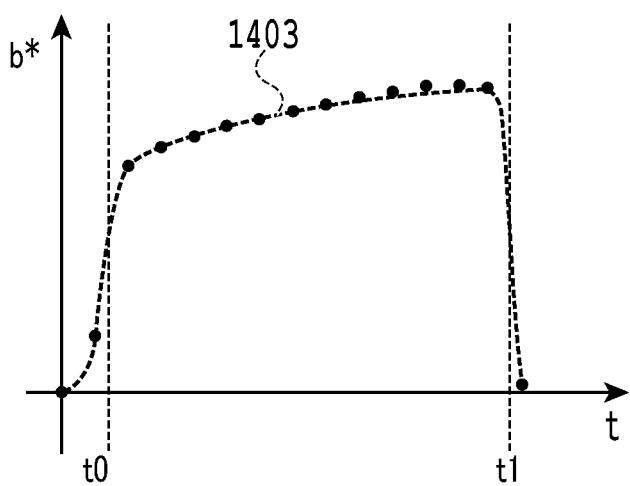

At S1212 that follows, based on the colorimetric data obtained at S1205, the calculation of the colorimetry position corresponding to the end portion of the measurement area of the SS chart is performed. FIG. 13B is a diagram showing a positional relationship between the SS chart and the colorimetry position of the colorimeter 209. In FIG. 13B, marks 1303a to 1303o indicate the colorimetry positions by the colorimeter 209. That is, the colorimeter 209 performs colorimetry at each position indicated by the marks 1303a to 1303o while passing over the rectangular area 1301 and performing a scan, and obtains L*a*b* values as the colorimetric values, which are found from the average spectral reflectance of the rectangular area 1301. Further, in the present embodiment, by adjusting the moving speed and the colorimetry timing of the colorimeter 209, the colorimetric values are obtained at the interval just four times the interval of the thin lines 1302 as shown in FIG. 13B. Based on the L*a*b* values at each colorimetry position obtained as described above, colorimetry positions t0 and t1 corresponding to the end portions of the measurement area of the SS chart are estimated. FIG. 14C is a graph obtained by plotting the colorimetric value (b* value) obtained by the colorimeter 209 at each colorimetry position t. By the publicly known interpolation processing, such as the spline interpolation, it is possible to obtain a curve passing through each black circle (plotted point), such as a chain line 1403 in FIG. 14C, and from the curve, it is possible to calculate the colorimetry positions t0 and t1 corresponding to the end portions of the measurement area by the edge detection or the threshold value processing.

At S1213, the estimation of the pixel position corresponding to each colorimetry position is performed. As shown in FIG. 13A, in the measurement area of the SS chart, the patch image whose density is substantially uniform is formed and it is difficult to cause the colorimetry position and the pixel position to correspond to each other by the analysis of the line profile. Consequently, in the present embodiment, the colorimetry position and the pixel position are caused to correspond to each other by using the thin lines 1302 as the position adjustment pattern. At this time, due to factors, such as sheet conveyance meandering, paper floating, and skew, the correspondence relationship between the colorimetry position and the pixel position changes each time scanned data is obtained. Consequently, even though the length of the sensor and the end portions (pixel positions xa1 and xb1) of the measurement area are already known, it is preferable to cause both to correspond to each other each time scanned data is obtained. The estimation of the pixel position corresponding to each colorimetry position is implemented by calculating a pixel position xn corresponding to an arbitrary colorimetry position tn by using the pixel position (x-position) corresponding to the ruler obtained at S1204.

Figure 15:
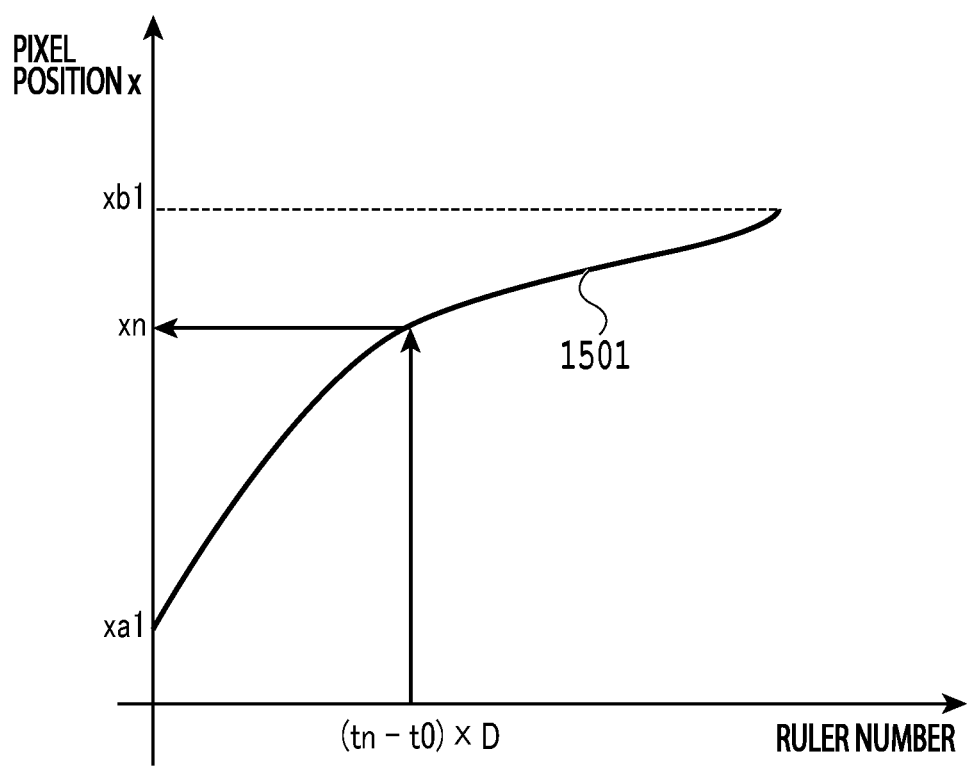
FIG. 15 is a diagram showing one example of correspondence between a ruler number and a pixel position.

Here, explanation is given by using a specific example. FIG. 15 is a graph in a case where the pixel position is taken along the vertical axis and the ruler number is taken along the horizontal axis and a curve 1501 indicates a relationship between the number of each thin line (ruler number) and the pixel position x. The ruler number may be assigned to each thin line so that the ruler numbers are 0, 1, 2, . . . , from the leftmost thin line and it is possible to obtain a continuous curve by performing the publicly known interpolation processing. It is preferable for the relationship between the ruler number and the pixel position to be linear, but in many cases, the relationship is obtained as a curve as shown in FIG. 15 due to the distortion of the optical system, such as sheet meandering and aberration. At this time, a ruler number N corresponding to the colorimetry position tn is found by formula (1) below.

$$\text{ruler number } N = (tn - t0) \times D \qquad \text{formula (1)}$$

In formula (1) described above, D is an interval ratio of colorimetry for the interval of the ruler and here, D=4. By applying "relationship between ruler number and pixel position" obtained as the curve 1501 to the ruler number N thus obtained, it is possible to obtain the pixel position corresponding to an arbitrary colorimetry position. Here, it is made easy to establish correspondence by setting the colorimetry interval to a regular interval and an integer multiple of (here, four times) the number of rulers. By performing adjustment so that the end portions of the rectangular area 1301 are located at some colorimetry positions, estimation is made easier. For example, in a case where the start position of colorimetry can be designated, it is preferable to perform adjustment so that t0=0.

Figure 16A:
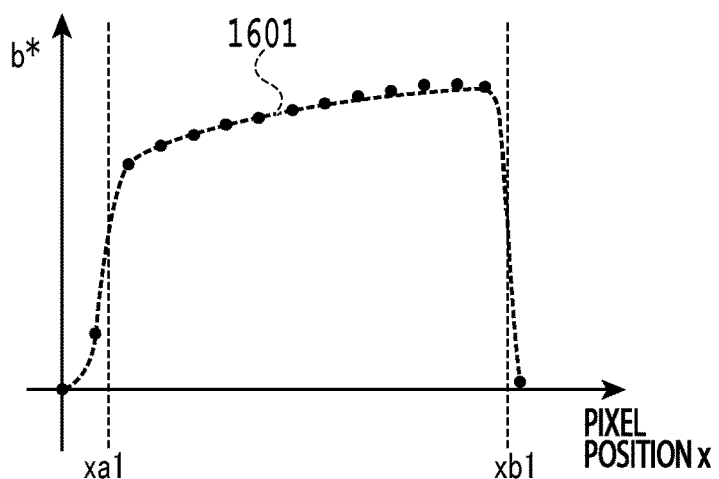
FIG. 16A to FIG. 16C are each an explanatory diagram of processing to convert a colorimetry portion into a pixel position.
Figure 16B:
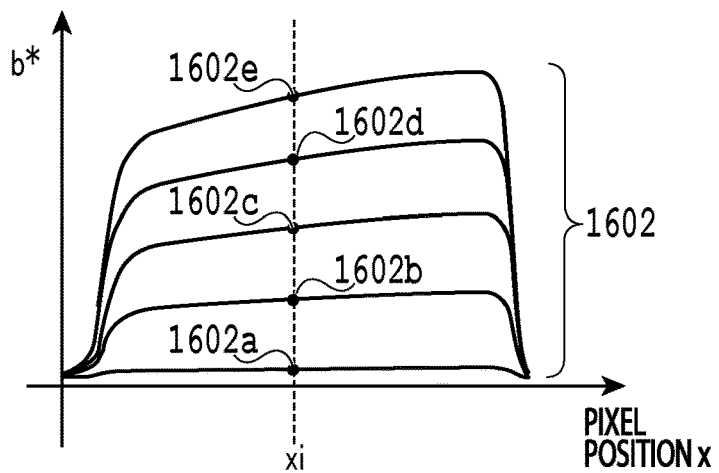

By the processing up to this point, the relationship between the sensor pixel position x and the colorimetric value (here, b* value of L*a*b* values) as shown by each black circle in the graph in FIG. 16A is obtained. Further, by the interpolation processing using the value of each black circle, it is possible to obtain a curve 1601 in FIG. 16A. Furthermore, by performing the same processing for each measurement area of the SS chart, it is possible to obtain the same number of curves as the number of measurement areas. For example, in a case where the SS chart including five measurement areas is used, as shown in FIG. 16B, five curves 1602 indicating the relationship between the sensor pixel position and the colorimetric value (b* value) are obtained.

At S1214, a pixel position of interest xi is initialized, which is the correction amount derivation target. Specifically, in a case where the scan correction table for the line sensor 208a is generated, xi=0 is set. Alternatively, it may also be possible to perform initialization at the pixel position xa0 or xa1. Further, in a case where the scan correction table for the line sensor 208b is generated, initialization is performed at a pixel position xb0.

Figure 16C:
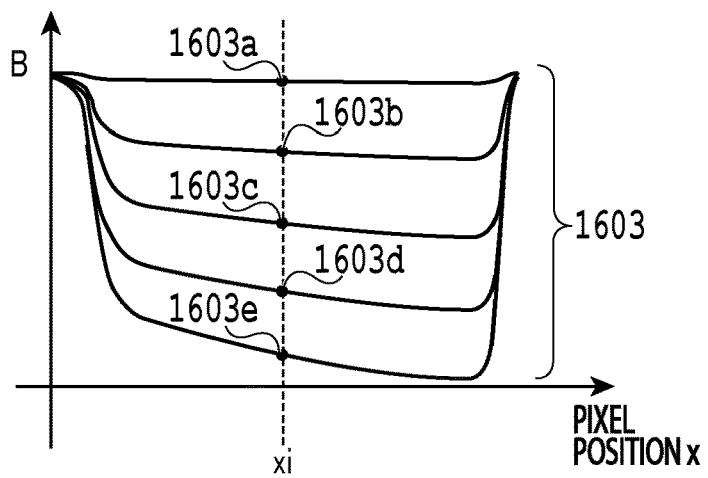
Figure 17A:
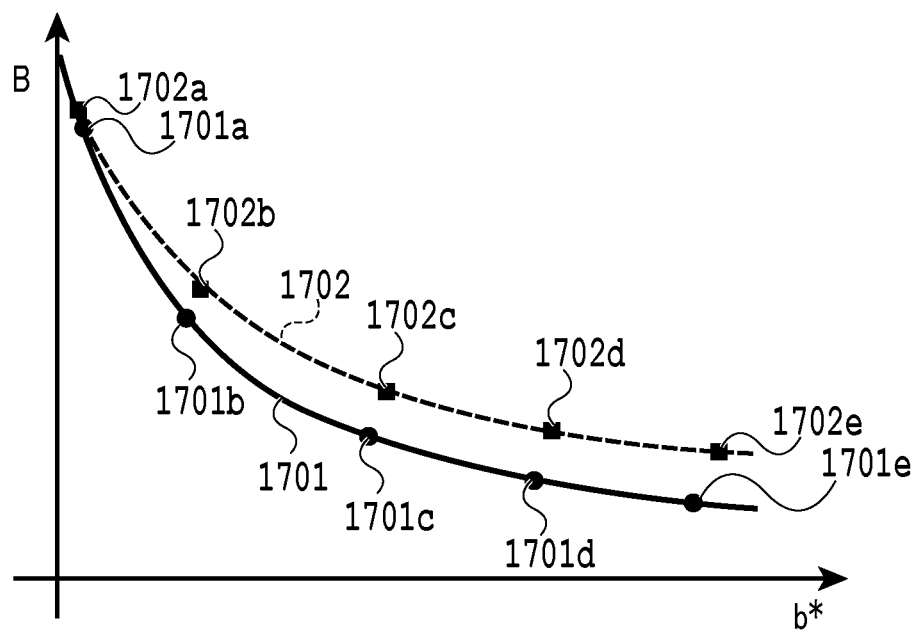
FIG. 17A and FIG. 17B are each a diagram explaining calculation of a correction value.
Figure 17B:
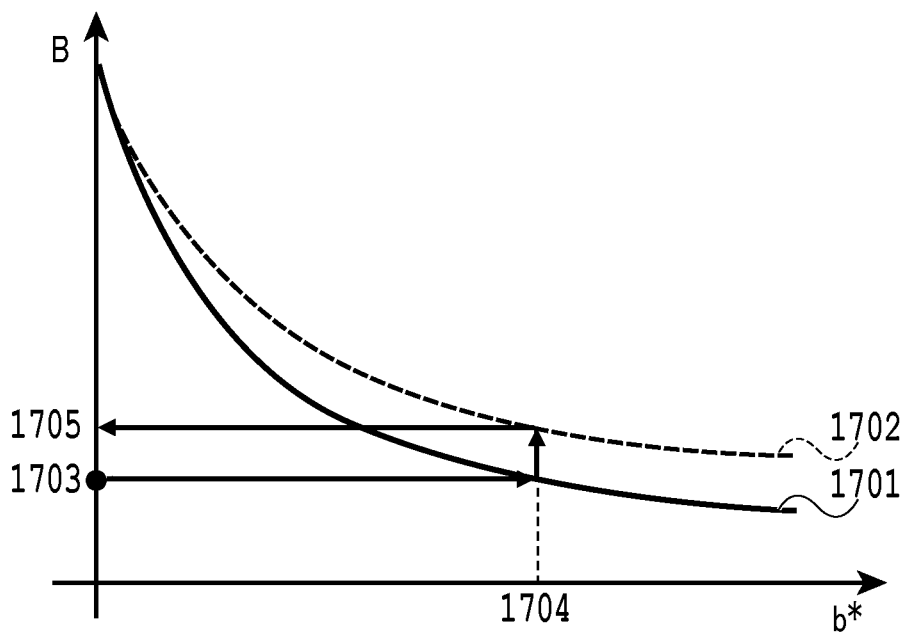

At S1215 that follows, the corrected sensed value (corrected value) for the pixel position of interest xi is determined. Here, explanation is given by using a specific example. First, from the five curves 1602 indicating the relationship between the sensor pixel position x and the colorimetric value (b* value), which are obtained at the steps up to S1213, five colorimetric values 1602a to 1602e at the pixel position of interest xi are obtained. Further, as shown in FIG. 16C, by referring to line profiles 1603 obtained at S1204, sensed values (signal values B) 1603a to 1603e at the pixel position of interest xi are obtained. In a case where one of the colorimetric values 1602a to 1602e has the same alphabet of the value, which is one of the sensed values 1603a and 1603e, it is meant that both the values are for the same measurement area. FIG. 17A is a graph in a case where the sensed value (signal value B) is taken along the vertical axis and the colorimetric value (b* value) is taken along the horizontal axis and each of black circles 1701a to 1701e represents the point at which the colorimetric value (b* value) and the sensed value (signal value B) at the pixel position of interest xi for each measurement area are plotted. Further, a solid line curve 1701 in the graph in FIG. 17A is a curve obtained by using the publicly known interpolation calculation or approximation processing for each of the black circles 1701a to 1701e. Further, a broken line curve 1702 represents the corrected target characteristics of the sensed value and each of black rectangles 1702a to 1702e corresponds to each of the black circles 1701a to 1701e. As the target value, for example, the sensed value corresponding to some colorimetry position x is adopted. Alternatively, it may also be possible to use the average output value of the entire sensor or at the center portion of the sensor as the target value. Alternatively, it may also be possible to store in advance and use the characteristics curve of the sensor taken as a reference as the target sensor characteristics. Alternatively, it may also be possible to determine and store in advance and use so that the sensed value is linear to the luminance, the L* value, and the optical density. FIG. 17B is a diagram explaining a correction value calculation method. In the graph in FIG. 17B, a black circle 1703 indicates the sensed value before correction and corresponds to "0, 16, 32, . . . , 255" in the example of the scan correction table shown in FIG. 5 described previously. It is possible to obtain a colorimetric value (b* value) 1704 corresponding to the sensed value 1703 before correction from the characteristics curve 1701. Further, from the target characteristics curve 1702, a target sensed value (corrected value) 1705 corresponding to the colorimetric value 1704 is obtained. By causing the target sensed value 1705 thus obtained to correspond to the sensed value 1703 before correction, the corrected value at the pixel position of interest xi is determined. At this time, in a case where the sensed value before correction is "0" or the maximum output value (for example, 255) of the sensor, it may also be possible to forcibly set "0" or "255" as the corrected value. By repeating the processing such as this the number of times corresponding to the number of rows of the scan correction table, a scan correction table predefining the corrected value at each pixel position xi is obtained.

At S1216, whether all the pixel positions to be processed are already processed as the pixel position of interest is determined. In a case where there is an unprocessed pixel position, the processing advances to S1217 and the pixel position of interest xi is updated, and the processing returns to S1215 and the same processing is repeated. In a case where the pixel position in the x-direction is predefined at the interval of "100" as in the scan correction table shown in FIG. 5, in the updating processing at S1215, the pixel position of interest xi is increased by "100". Here, for example, in a case where the scan correction table for the line sensor 208a is generated, on a condition that the processing up to a pixel position xa2 is completed, it is possible to determine that all the pixel positions are already processed. Further, in a case where the scan correction table for the line sensor 208b is generated, on a condition that the processing up to the pixel position xb1 or xb2 is completed, it is possible to determine that all the pixel positions are already processed. In a case where the results of the determination such as this indicate that all the pixel positions to be processed are already processed, this processing is exited.

The above is the contents of the correction amount derivation processing.

It is preferable to form the rectangular area 1301 and the position adjustment pattern 1302 of the SS chart with the greatest width that can be formed by the print heads 201 to 204. That is, it is preferable to use a sheet on which an image can be formed with all the nozzles comprised by each of the print heads 201 to 204 and form the image with all the nozzles. Due to this, it is possible to directly obtain more values by calculation processing, not by interpolation processing.

Further, as the colorimetry position t, it may also be possible to use the relative distance from the first colorimetry position (position of the mark 1303a in FIG. 13B). Alternatively, in place of the colorimetry position, it may also be possible to derive the correction amount by using the number of times of colorimetry (1, 2, 3, 4, . . . ), the time of colorimetry or the like.

Further, at S1215, it may also be possible to use the value that takes into consideration the colorimetry position and the opening diameter of the colorimeter in a case where the sensed value at the pixel position of interest xi is calculated, in place of referring to the line profile as it is. That is, it may also be possible to average the line profile with the size equal to the opening diameter of the colorimeter by taking "pixel position corresponding to the colorimetry position" estimated at S1213 as the center and use a curve that is obtained by further performing the publicly known interpolation processing therefor in place of the line profile.

Further, in the above-described explanation, the example is explained in which the scan correction table is created independently for each of the line sensors 208a and 208b. However, it may also be possible to create one scan correction table for one line profile obtained by overlapping the output values of each line sensor. However, in a case where the line sensors are arranged at positions distant from each other in the conveyance direction, the overlap length changes on the paper surface due to the sheet conveyance error and the like, and therefore, there is a case where the correction amount of the overlap portion at the time of creation is different from that at the time of use. Further, in a case where the characteristics of the correction amount for the position become complicated due to the overlapping processing and particularly the correction amount is stored only for the discrete positions as in the scan correction table illustrated in FIG. 5, there is a possibility that the correction is not sufficient. Because of this, it is preferable to derive the correction amount for the output value of each line sensor before overlapping.

Effects of the Present Embodiment

Figure 18A:
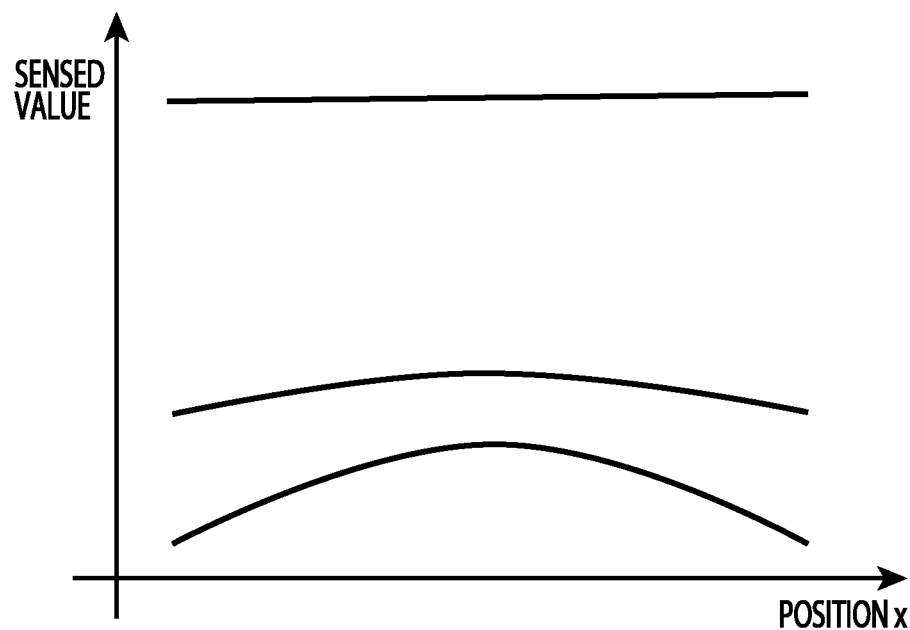
FIG. 18A and FIG. 18B are each a diagram explain variations of a sensed value with respect to a pixel position x.
Figure 18B:
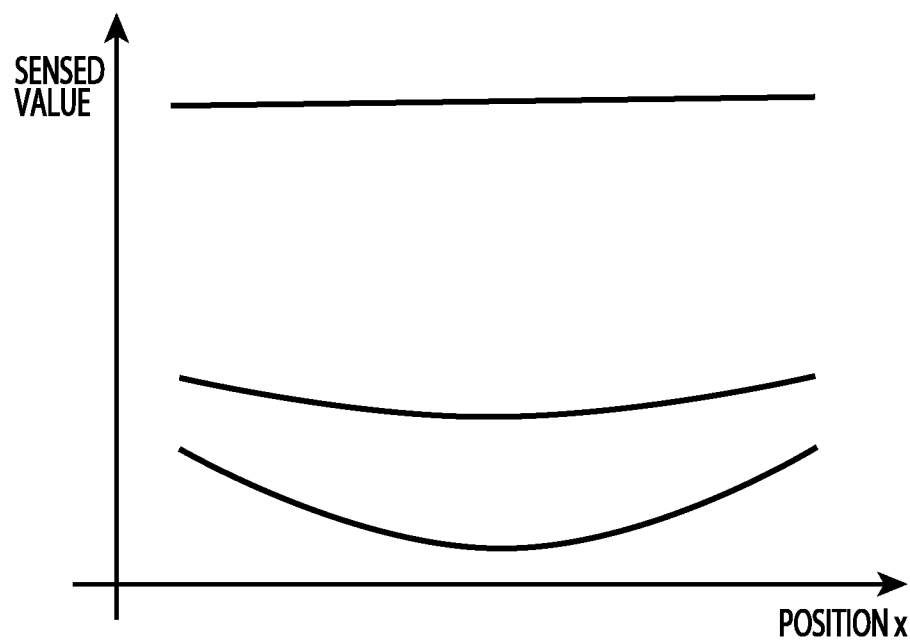

There is a case where the line sensor has sensor characteristics different for each pixel. The difference in the characteristics depend frequently on the incidence angle to the sensor pixel and the color filter and in such a case, it is frequent that the read value for the same incident light gradually increases or decreases along the sensor pixel position. FIG. 18A and FIG. 18B are each a conceptual diagram indicating the variations of the sensed value for the pixel position x. FIG. 18A and FIG. 18B are each a graph in a case where the position x on the line sensor is taken along the horizontal axis and the sensed value is taken along the vertical axis. Further, each curve on the graph indicates the sensed value at each pixel position in a case where a plurality of density charts whose spectral reflectance on the paper surface is substantially the same irrespective of the position is read. Here, it is assumed that the higher the reflectance of the sheet (that is, the closer the sheet to white paper), the larger the sensed value is and the higher the density of the paper surface, the smaller the sensed value is. At this time, as shown in FIG. 18A or FIG. 18B, in many cases, the curve corresponding to the measurement area whose sensed value is relatively small indicates a large difference between the center portion and the end portion. That is, in many cases, the higher the color signal value and the higher the image density of the paper surface, the larger the difference in the sensor characteristics becomes. As one of the causes of this, it is considered that the incidence angle to the sensor becomes large at the end portion and the light path on the color filter provided in the sensor pixel becomes longer. Specifically, it is considered that the change on the spectral distribution due to the color filter for the light incident on the sensor becomes large at the end portion compared to that at the center portion and as a result of that, the sensed value changes. Further, it is also considered as one of the causes that in a case where the incidence angle to the sensor is large, for example, the light that should enter the G sensor enters the B channel adjacent to the G sensor as stray light. Then, the difference in the characteristics between the center portion and the end portion such as this, which depends on the pixel position, is likely to occur in the B sensor particularly. Because of this, in many cases, a problem arises in the head shading correction processing of the head 204 corresponding to yellow.

In the present embodiment, in order to address such a problem that the sensor characteristics are different between the center portion and the end portion of the line sensor, the influence of the difference in the sensor characteristics is lessened by the sensor shading correction processing (S706) in the color adjustment table generation processing (flow in FIG. 7). That is, based on the output value of each line sensor and the scan correction table, conversion into the color signal value taking into consideration the characteristics of the line sensor is performed. Then, by performing the head shading correction processing based on the converted color signal value, the influence of the difference in the sensor characteristics exerted on the head shading correction processing is lessened. At this time, by using the colorimeter that does not depend on the colorimetry position and whose repeated reproducibility is high, it is possible to correct the characteristics that depend on the sensor pixel position. For example, in a case where the sensed value at the center portion of the line sensor and the colorimetric value thereof are used as the target characteristics, it is possible to perform the head shading correction processing with the sensed value corresponding to the case where the value is read by the sensor at the center portion irrespective of the position of a printed material.

Modification Example

Figure 19A:
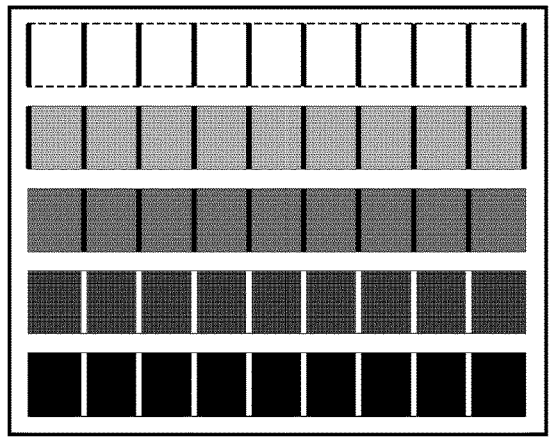
FIG. 19A to FIG. 19C are each a diagram showing one example of the SS chart.
Figure 19B:
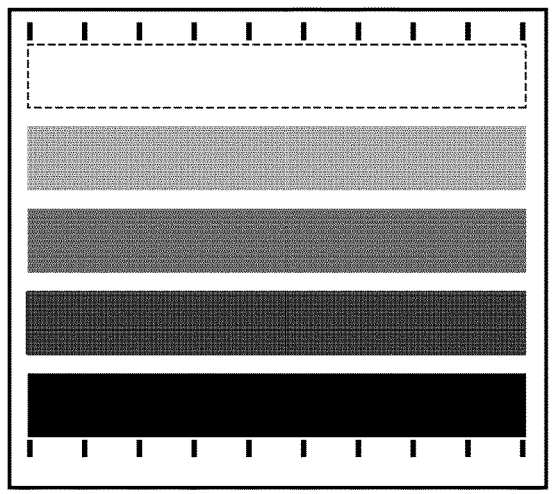
Figure 19C:
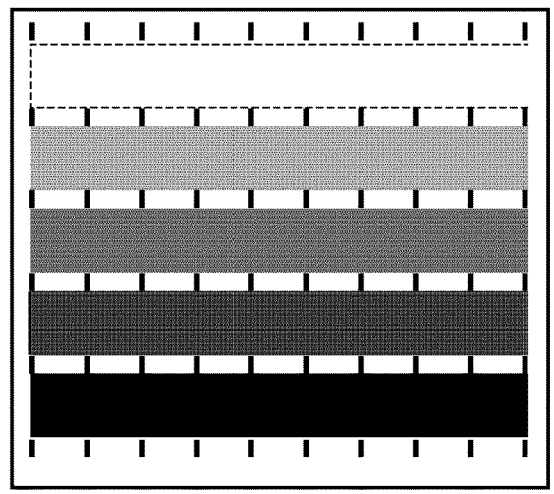
Figure 20A:
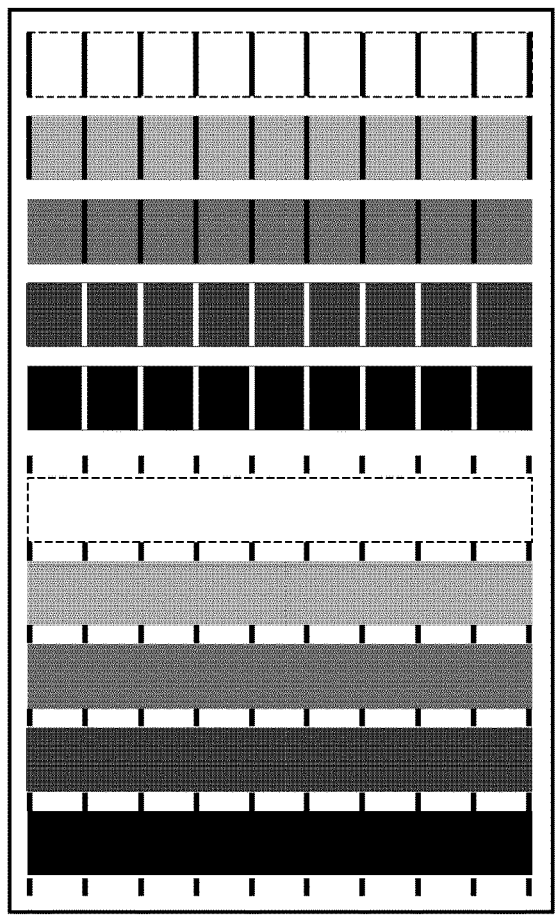
FIG. 20A and FIG. 20B are each a diagram showing one example of the SS chart.
Figure 20B:
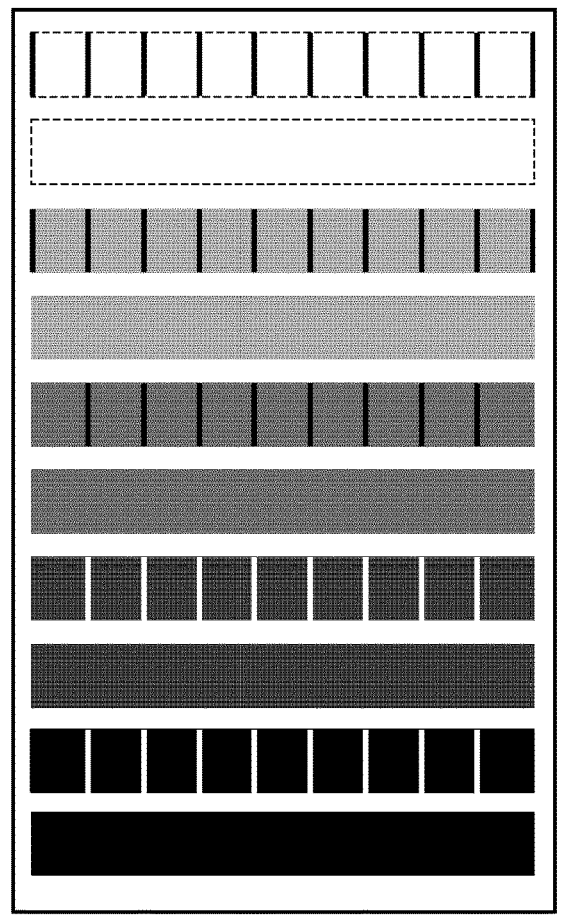

In a case where colorimetry is performed for the SS chart at S1204 described previously, it may also be possible to perform colorimetry off-line by using an external colorimeter in place of performing colorimetry on-line by sung the colorimeter inside the apparatus. In this case, it is sufficient to taken out the printed and output SS chart from the image forming apparatus, manually slide the colorimeter on each measurement area within the SS chart, and input the obtained colorimetric value through the operation unit 103 or the I/F unit 109. Alternatively, it is also possible to fix the SS chart on the x-y stage and perform colorimetry on each measurement area within the SS chart. In a case where the colorimeter is slid manually, it is difficult to obtain the colorimetric value at regular intervals. Consequently, it may also be possible to use the chart including the separation positions within the measurement area as shown in FIG. 19A. However, embedding the separation line in the measurement area may cause the colorimetric value or the signal value to change due to the influence thereof and there is a case where the accuracy of the SS chart that is created decreases. Particularly, while it is possible for the colorimeter to obtain the colorimetric value without including the separation line within the opening thereof and without being affected by the separation line, there is a case where the read value of the signal value that is obtained by the line sensor changes depending on the presence/absence of the separation line due to the influence of the wraparound of light. Consequently, it may also be possible to use a chart not including the separation line inside the measurement area and in which the separation line is provided at the top and bottom of the paper surface or between the measurement areas, for example, as shown in FIG. 19B or FIG. 19C. That is, for the colorimetry at S1204 described previously, the chart shown in FIG. 19A is used and for the reading at S1203, the chart shown in FIG. 19B or FIG. 19C is used. At this time, the separation lines within the measurement area in the chart in FIG. 19A and the separation lines outside the measurement area of the chart in FIG. 19B or FIG. 19C are formed at the same interval. There is a case where the use of the thin lines 1302 as shown in FIG. 13A as the separation lines makes the detection with the colorimeter difficult. Because of this, it is preferable for the separation line within the measurement area to be a pattern having a width to a certain extent, not the thin line as shown in FIG. 19A. Further, it is preferable for the separation line outside the measurement area to have substantially the same width as that of the separation line within the measurement area, in addition to the same interval. Due to this, in a case where the same processing as that for the separation line within the measurement area is performed, it is possible to detect substantially the same position. It is possible to create the SS chart by detecting the position of the separation line such as this for the read image and the colorimetric value, respectively, and causing the colorimetry position and the pixel position on the line profile to correspond to each other based on the position. It is also possible to form the measurement area including the separation line for colorimetry and the measurement area not including the separation line for colorimetry within one sheet as shown in FIG. 20A and FIG. 20B. At this time, it may also be possible to arrange the measurement area for colorimetry and the measurement area for scan alternately as shown in FIG. 20B. In this case, it may also be possible to read the separation line for colorimetry and use the position of the separation line within the measurement area as the separation position outside the measurement area.

Further, in many cases, the correction amount at each pixel position changes gradually for the image position and the sensed value. Because of this, in order to reduce the noise included in the colorimetric value and the color signal value, it may also be possible to perform the publicly known averaging processing or the filter processing in the image position direction or in the sensor output direction for the calculated corrected value. It may also be possible to perform correction processing by using an approximate curve that is obtained by the publicly known approximation method.

Further, in the embodiment described above, explanation is given on the assumption that the color adjustment unit 302 performs the correction processing for the input image data (CMYK). However, it is also possible to obtain the same effects by performing the correction processing for the threshold value matrix that is used by the HT processing unit 305.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to correct the sensor characteristics of a scanner device with a high accuracy based on colorimetric data.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-198092, filed Dec. 12, 2022 which is hereby incorporated by reference wherein in its entirety.

What is claimed is:

1. An image forming apparatus comprising:
a printing unit configured to perform print processing while conveying a sheet based on image data;
a memory for storing computer-executable instructions; and
one or more processors configured to execute the instructions stored in the memory so as to function as:
a first generation unit configured to generate correction information for correcting a sensed value of a scan unit based on scanned data obtained by the scan unit reading a first chart output by the printing unit and colorimetric data obtained by a colorimetry unit measuring the first chart;
a second generation unit configured to generate color adjustment information in accordance with characteristics of the printing unit by correcting the sensed value of the scan unit by using the correction information based on colorimetric data obtained by the colorimetry unit measuring a second chart output by the printing unit; and
an image processing unit configured to perform color adjustment processing for the image data by using the color adjustment information,
wherein
the first chart includes a patch extending in a main scanning direction substantially perpendicular to a sheet conveyance direction and having a uniform density, and a position adjustment pattern formed outside the patch for identifying a position in the main scanning direction on the patch,
the first generation unit generates the correction information by causing a pixel position of an end portion of the patch in the scanned data and a colorimetry position of an end portion of the patch in the colorimetric data to correspond to each other and determining a corrected value of the sensed value at a specific pixel position, and
the first generation unit:
detects a pixel position corresponding to an end portion of the patch based on the scanned data;
calculates a colorimetry position corresponding to an end portion of the patch based on the colorimetric data; and
determines a corrected value of the sensed value at the specific pixel position by estimating a pixel position corresponding to each colorimetry position of the colorimetric data.

2. The image forming apparatus according to claim 1, wherein
the first generation unit estimates the pixel position corresponding to each of the colorimetry positions by calculating from a pixel position corresponding to the position adjustment pattern obtained from the scanned data.

3. The image forming apparatus according to claim 1, wherein
the position adjustment pattern is thin lines formed at a regular interval in the main scanning direction and
the colorimetry unit performs measurement of a color at an interval an integer multiple of the regular interval.

4. The image forming apparatus according to claim 1, wherein
the correction information is generated for each color of a color material used in the print processing.

5. An image forming apparatus comprising:
a printing unit configured to perform print processing while conveying a sheet based on image data;
a memory for storing computer-executable instructions; and
one or more processors configured to execute the instructions stored in the memory so as to function as:
a first generation unit configured to generate correction information for correcting a sensed value of a scan unit based on scanned data obtained by the scan unit reading a first chart output by the printing unit and colorimetric data obtained by a colorimetry unit measuring the first chart;

a second generation unit configured to generate color adjustment information in accordance with characteristics of the printing unit by correcting the sensed value of the scan unit by using the correction information based on colorimetric data obtained by the colorimetry unit measuring a second chart output by the printing unit; and an image processing unit configured to perform color adjustment processing for the image data by using the color adjustment information, wherein the first chart includes a patch extending in a main scanning direction substantially perpendicular to a sheet conveyance direction and having a uniform density, and a position adjustment pattern formed outside the patch for identifying a position in the main scanning direction on the patch, the first generation unit generates the correction information by causing a pixel position of an end portion of the patch in the scanned data and a colorimetry position of an end portion of the patch in the colorimetric data to correspond to each other and determining a corrected value of the sensed value at a specific pixel position, and the correction information is generated for a specific color likely to cause the sensed value of the scan unit to differ between a center portion and an end portion of the patch among color materials used in the print processing.

6. The image forming apparatus according to claim 5, wherein
the specific color is yellow.

7. The image forming apparatus according to claim 1, wherein
the first chart and the second chart are identical.

8. The image forming apparatus according to claim 1, wherein
the first chart and the second chart are different.

9. The image forming apparatus according to claim 8, wherein
in the first chart, more patches of a color signal value to which great importance to be given in sensor shading correction processing are arranged and
in the second chart, more patches of a color signal value to which great importance to be given in head shading correction processing are arranged.

10. The image forming apparatus according to claim 1, wherein
the colorimetry unit obtains, as colorimetric data, a spectral reflectance obtained by performing measurement for a color at a predetermined position of a sheet that is conveyed while scanning the color in the main scanning direction, or a color value in a device-independent color space, which is calculated from the spectral reflectance.

11. The image forming apparatus according to claim 10, wherein
the color value in the device-independent color space is CIE Lab.

12. The image forming apparatus according to claim 1, wherein the printing unit performs the print processing by conveying a sheet in one direction and ejecting ink droplets from a print head covering the full width of the conveyed sheet.

13. The image forming apparatus according to claim 1, wherein
the scan unit covers the full width of the sheet by arranging a plurality of line sensors in an overlapping manner.

14. The image forming apparatus according to claim 1, wherein
a conveyance unit configured to convey a sheet to the printing unit, the scan unit, and the colorimetry unit is a common unit.

15. An image forming apparatus comprising:
a printing unit configured to perform print processing while conveying a sheet based on image data;
a memory for storing computer-executable instructions; and
one or more processors configured to execute the instructions stored in the memory so as to function as:
a first generation unit configured to generate correction information for correcting a sensed value of a scan unit based on scanned data obtained by the scan unit reading a first chart output by the printing unit and colorimetric data obtained by a colorimetry unit measuring the first chart;
a second generation unit configured to generate color adjustment information in accordance with characteristics of the printing unit by correcting the sensed value of the scan unit by using the correction information based on colorimetric data obtained by the colorimetry unit measuring a second chart output by the printing unit; and
an image processing unit configured to perform color adjustment processing for the image data by using the color adjustment information,
wherein
the first chart includes a patch extending in a main scanning direction substantially perpendicular to a sheet conveyance direction and having a uniform density, and a position adjustment pattern formed outside the patch for identifying a position in the main scanning direction on the patch,
the first generation unit generates the correction information by causing a pixel position of an end portion of the patch in the scanned data and a colorimetry position of an end portion of the patch in the colorimetric data to correspond to each other and determining a corrected value of the sensed value at a specific pixel position,
the scan unit covers the full width of the sheet by arranging a plurality of line sensors in an overlapping manner, and
the first generation unit generates the correction information for each of the plurality of line sensors.

16. The image forming apparatus according to claim 15, wherein
for each of the plurality of line sensors, the first generation unit:
generates a line profile by identifying an image area of the patch from the scanned data; and
generates the correction information based on the line profile.

17. An image forming apparatus comprising:
a printing unit configured to perform print processing while conveying a sheet based on image data;

a memory for storing computer-executable instructions; and one or more processors configured to execute the instructions stored in the memory so as to function as:

a first generation unit configured to generate correction information for correcting a sensed value of a scan unit based on scanned data obtained by the scan unit reading a first chart output by the printing unit and colorimetric data obtained by a colorimetry unit measuring the first chart;

a second generation unit configured to generate color adjustment information in accordance with characteristics of the printing unit by correcting the sensed value of the scan unit by using the correction information based on colorimetric data obtained by the colorimetry unit measuring a second chart output by the printing unit; and an image processing unit configured to perform color adjustment processing for the image data by using the color adjustment information, wherein the first chart includes a patch extending in a main scanning direction substantially perpendicular to a sheet conveyance direction and having a uniform density, and a position adjustment pattern formed outside the patch for identifying a position in the main scanning direction on the patch, the first generation unit generates the correction information by causing a pixel position of an end portion of the patch in the scanned data and a colorimetry position of an end portion of the patch in the colorimetric data to correspond to each other and determining a corrected value of the sensed value at a specific pixel position, and a conveyance unit configured to convey a sheet to the printing unit and the scan unit and a conveyance unit configured to convey a sheet to the colorimetry unit are different.

* * * * *